(12) United States Patent
Myers et al.

(10) Patent No.: US 7,076,493 B2
(45) Date of Patent: Jul. 11, 2006

(54) DEFINING A DATA DEPENDENCY PATH THROUGH A BODY OF RELATED DATA

(75) Inventors: Jack E Myers, Manhattan Beach, CA (US); Rodney T Ravenelle, Dana Point, CA (US); Stephen W Peacock, Alhambra, CA (US)

(73) Assignee: Metadata, LLC, Brentwood, TN (US)

( * ) Notice: Subject to any disclaimer, the term of this patent is extended or adjusted under 35 U.S.C. 154(b) by 0 days.

(21) Appl. No.: 10/855,572

(22) Filed: May 28, 2004

(65) Prior Publication Data

US 2005/0278275 A1 Dec. 15, 2005

(51) Int. Cl.
*G06F 17/30* (2006.01)

(52) U.S. Cl. ...................................... 707/101; 707/102
(58) Field of Classification Search ...................... None
See application file for complete search history.

(56) References Cited

U.S. PATENT DOCUMENTS

| | | | |
|---|---|---|---|
| 5,659,724 A | | 8/1997 | Borgida et al. |
| 5,687,367 A | | 11/1997 | Dockter et al. |
| 5,740,421 A | | 4/1998 | Palmon |
| 5,745,895 A | | 4/1998 | Bingham et al. |
| 5,806,060 A | | 9/1998 | Borgida et al. |
| 5,940,822 A | | 8/1999 | Haderle et al. |
| 5,970,490 A | * | 10/1999 | Morgenstern ................. 707/10 |
| 5,978,811 A | | 11/1999 | Smiley |
| 6,029,169 A | | 2/2000 | Jenkins |
| 6,094,649 A | | 7/2000 | Bowen et al. |
| 6,163,774 A | | 12/2000 | Lore et al. |
| 6,263,341 B1 | | 7/2001 | Smiley |
| 6,366,922 B1 | | 4/2002 | Althoff |
| 6,385,604 B1 | | 5/2002 | Bakalash et al. |
| 6,516,321 B1 | | 2/2003 | De La Huerga |
| 6,611,837 B1 | | 8/2003 | Schreiber |
| 6,636,865 B1 | | 10/2003 | Ahmadi |

OTHER PUBLICATIONS

Kjeldsberg et al., "data dependency size estimation for use in memory optimization", IEEE, vol. 22, No. 7, Jul. 2003.*
Chen et al., "An execution model for limited ambiguity rules and its application to derived data update", ACM vo.20, No. 4, Dec. 1995, pp. 365-413.*
Tari et al., "Object normal forms and dependency constraints for object-oriented schemata", ACM, vol. 22, No. 4, Dec. 1997, pp. 513-569.*
Grant E. Weddell, "Reasoning about functional dependencies generalized for semantic data models", ACM, vol. 17, No. 1, Mar. 1992, pp. 32-64.*
Jeanne Ferrante Jeanne, "A program form based on data dependency in predicate regions", pp. 217-236.*
Laski et al., "Dependency analysis of ADA programs", pp. 263-275.*
Chuck et al., "Symbolic Modeling and evaluation of data paths", 1-6.*
Austin et al., "Dynamic dependency analysis of ordinary programs", pp. 342-351.*
Jack E. Myers; Data Modeling for Healthcare Systems Integration: Use of the Metamodel; copyright 1996 by Metadata; pp. 12.
Ellis Booker; Sun, Oracle Partner on "Raw Iron" Project; Internetweek.com; Today's News; Dec. 14, 1998; pp. 3; http://www.internetwk.com/news.
GridApp Systems; GridApp Systems-Agile solutions for the Enterprise; 2003; pp. 4; www.gridapp.com.
MTI; MTI V-Cache Application Accelerator Technical Overview; White Paper; v 1.0; Aug. 21, 2001; pp. 18.
Pogo Linux and MySQL AB Launch First MySQL Database Appliance; Aug. 5, 2003; pp. 2; http://www.mysql.com.
Performance Netezza Performance Server 8000 Series; The first Tera-Scale Data Appliance for Business Intelligence; pp. 8; www.netezza.com.
Steve W. Kelso; Jack E. Myers; The Metadata Company; Innovators in Data Management Technology; Integrating Medication Management into the Electronic Patient Record; pp. 10.

\* cited by examiner

*Primary Examiner*—Jean M. Corrielus
(74) *Attorney, Agent, or Firm*—Banner & Witcoff, Ltd.

(57) ABSTRACT

A data dependency path calculator for a semantic search engine is provided. A body of semantically related data is modeled according to a semantic data model. A user is presented a list of data elements from which they may select desired data elements. The system automatically calculates all of the possible paths through the database that may be used to retrieve meaningful data based on the selected data elements. The available data dependency paths are returned to the user for selection. The system further provides a type of data permission that allows restricted data elements to be used as a pass-through data element for relating, connecting and retrieving non-restricted data. Thus, a user can use restricted data to create data dependency paths to retrieve meaningful data.

46 Claims, 25 Drawing Sheets

LOGICAL OPERATORS

| = | ∧ | ∨ |
|---|---|---|
| also known as | owns | belongs to |
| analogous to | manages | managed by |
| equivalent to | uses | used by |
| the same as | contains | goes into |

FIG. 4

|  | Number | Data Relation | Opposite Number | Opposite Relation |
|---|---|---|---|---|
| Simplex Data Relations | 1 | I | | |
| | 2 | ID | | |
| | 3 | IM | | |
| | 4 | IMD | | |
| | 5 | IM<I | 27 | I>IM |
| | 6 | IM<ID | 15 | IM>IM |
| | 7 | IM<IM | 23 | I=IM |
| | 8 | IM<IMD | 11 | IM=IM |
| | 9 | IM=I | 19 | I<IM |
| | 10 | IM=ID | 7 | IM<IM |
| | 11 | IM=IM | 25 | I>I |
| | 12 | IM=IMD | 13 | IM>I |
| | 13 | IM>I | 21 | I=I |
| | 14 | IM>ID | 9 | IM=I |
| | 15 | IM>IM | 17 | I<I |
| Complex Data Relations | 16 | IM>IMD | 5 | IM<I |
| | 17 | I<I | | |
| | 18 | I<ID | | |
| | 19 | I<IM | | |
| | 20 | I<IMD | | |
| | 21 | I=I | | |
| | 22 | I=ID | | |
| | 23 | I=IM | | |
| | 24 | I=IMD | | |
| | 25 | I>I | | |
| | 26 | I>ID | | |
| | 27 | I>IM | | |
| | 28 | I>IMD | | |

*Metamodel Data Relations*

FIG. 5

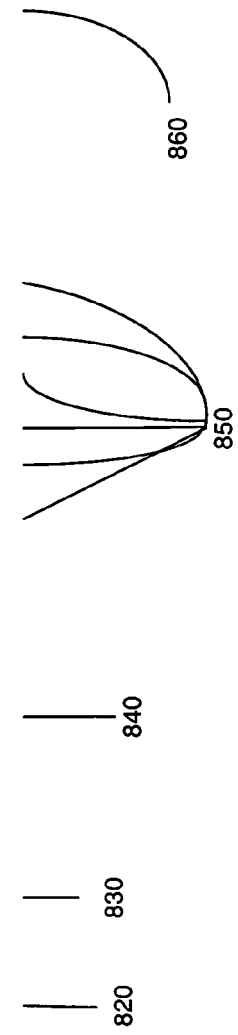

| MEMBER VIEW (1) | | | | | | | | |
|---|---|---|---|---|---|---|---|---|
| REL | DEN | NAME | 1 | 2 | 3 | 4 | 5 | 6 | DESCRIPTION OF RELATION |
| I | 0001 | MEMBER | * | * | * | * | * | * | A member. |
| ID | 0002 | ADDRESS | * | | | | | | A member has an address. |
| ID | 0006 | GENDER | * | | | | | | A member has a gender. |
| ID | 0009 | MEMBER NAME | * | | | | | | A member has a name. |
| ID | 0017 | COB CODE | * | | | | | | A member has a coordination of benefits code. |
| ID | 0019 | BIRTH DATE | * | | | | | | A member has a birth date. |
| IM | 0003 | DATE | * | | | | | | A member on a particular date. |
| IMD | 0004 | BLOOD PRESSURE | * | | * | | | | A member on a particular date has a blood pressure. |
| IMD | 0007 | WEIGHT | * | | | * | | | A member on a particular date has a weight. |
| IM | 0011 | EFFECTIVITY | * | * | | | | | A member for a time |
| IM>I | 0005 | PROVIDER | * | * | | | * | | A member for a time receives care from a provider. |
| IM>I | 0008 | HEALTH PLAN | * | * | | | * | | A member for a time owns a health plan. |
| I=I | 0012 | SUBSCRIBER | * | | * | * | | * | A member is equivalent to a subscriber. |
| I=IM | 0013 | MEMBER RELATION | * | | * | * | | | A member is identified by a subscriber with a membership code. |
| I<I | 0014 | RX | * | | | | | * | A member receives a prescription. |
| I<I | 0021 | CLAIM | * | | * | * | | * | A member submits a claim. |

FIG. 8(a)

| SUBSCRIBER VIEW (2) | | | | | | | | | DESCRIPTION OF RELATION |
|---|---|---|---|---|---|---|---|---|---|
| REL | DEN | NAME | 1 | 2 | 3 | 4 | 5 | 6 | |
| I | 0012 | SUBSCRIBER | * | * | | | | | A subscriber. |
| IM | 0013 | MEMBER RELATION | * | * | * | | | | A subscriber with a member relationship code. |
| IM=I | 0001 | MEMBER | * | * | * | * | * | * | A subscriber with a member relationship code is how we identify a member. |

FIG. 8(b)

| PRESCRIPTION VIEW (3) | | | | | | | | |
|---|---|---|---|---|---|---|---|---|
| REL | DEN | NAME | 1 | 2 | 3 | 4 | 5 | 6 | DESCRIPTION OF RELATION |
| I | 0014 | RX | * | | | | | | A prescription. |
| ID | 0015 | DRUG NAME | | | * | | | | A prescription has a drug. |
| IM | 0022 | RX DATE | | | * | | | * | A prescription on a prescription date. |
| IMD | 0016 | RX FILL QUANTITY | | | * | * | | | A prescription on a prescription date has a fill quantity. |
| IMD | 0020 | RX PRICE | | | * | | * | | A prescription on a prescription date has a price. |
| IM>I | 0021 | CLAIM | * | | * | * | | * | A prescription on a prescription date is part of a claim. |
| I>I | 0001 | MEMBER | * | * | | * | | * | A prescription is received by a member. |
| I>I | 0005 | PROVIDER | * | | * | * | | * | A prescription is given by a provider. |

Select Data View
- ☑ Member
- ☐ Subscriber
- ☑ Prescription (RX)
- ☐ Provider
- ☐ Health Plan
- ☑ Claim

[ Add to View ]

Select Data Elements/Data Names

| DEN | NAME | Select |
|---|---|---|
| 0001 | Member | ☐ |
| 0002 | Address | ☐ |
| 0003 | Date | ☐ |
| 0004 | Blood Pressure | ☐ |
| 0005 | Provider | ☐ |
| 0006 | Gender | ☑ |
| 0007 | Weight | ☐ |
| 0008 | Health Plan | ☐ |
| 0009 | Member Name | ☐ |
| 0011 | Effectivity | ☐ |
| 0012 | Subscriber | ☐ |
| 0013 | Member Relation Code | ☐ |
| 0014 | RX | ☐ |
| 0015 | Drug Name | ☑ |
| 0016 | RX Fill | ☐ |
| 0017 | COB Code | ☐ |
| 0018 | Claim Amount | ☑ |
| 0019 | Birth Date | ☑ |
| 0020 | Quantity | ☐ |
| 0021 | RX Price | ☐ |
| 0022 | RX Date | ☑ |

1023

1022

[ Clear ]   [ Select All ]

1024          [ Submit ]          1025

| I1_DEN | I1_VAL | M1_DEN | M1_VAL | I2_DEN | I2_VAL | M2_DEN | M2_VAL | D_DEN | D_VAL | RC |
|---|---|---|---|---|---|---|---|---|---|---|
| 0001 | 123-45-6789-10 | 0 | | 0 | | | | 0 | | 1 |
| 0001 | 123-45-6789-10 | | | | | | | 0009 | John Doe | 2 |
| 0001 | 123-45-6789-10 | 0003 | 09/01/04 | | | | | 0004 | 120/84 | 4 |
| 0001 | 123-45-6789-10 | 0003 | 09/30/04 | | | | | 0004 | 122/86 | 4 |
| 0001 | 123-45-6789-10 | 0 | | 0 | | | | 0002 | 123 Anywhere Street | 2 |
| 0001 | 123-45-6789-10 | 0011 | 01/01/04 to 01/01/05 | 0005 | Dr. Smith | 0 | | 0 | | 13 |
| 0012 | 123-45-6789 | 0 | | 0 | | 0 | | 0 | | 1 |
| 0012 | 123-45-6789 | 0013 | 10 | 0 | | 0 | | 0 | | 3 |
| 0012 | 123-45-6789 | 0013 | 10 | 0001 | 123-45-6789-10 | 0 | | 0 | | 9 |
| 0014 | 34R56T5R | 0 | | 0 | | 0 | | 0 | | 1 |
| 0014 | 34R56T5R | 0 | | 0 | | 0 | | 0015 | Cipro | 2 |
| 0014 | 34R56T5R | 0022 | 05/01/04 | 0 | | 0 | | 0 | | 3 |
| 0014 | 34R56T5R | 0022 | 05/01/04 | 0 | | 0 | | 0016 | 100 x 500 MG | 4 |
| 0014 | 34R56T5R | 0022 | 05/01/04 | 0 | | 0 | | 0020 | $63.99 | 4 |
| 0014 | 34R56T5R | 0022 | 05/01/04 | 0021 | 04050109 | 0 | | 0 | | 13 |
| 0014 | 34R56T5R | 0 | | 0001 | 123-45-6789-10 | | | 0 | | 25 |
| 0014 | 34R56T5R | 0 | | 0005 | Dr. Smith | | | 0 | | 25 |

FIG. 18

DEFINING A DATA DEPENDENCY PATH THROUGH A BODY OF RELATED DATA

FIELD OF THE INVENTION

The invention relates generally to database systems. More specifically, the invention provides a method and apparatus for defining a data dependency path through a body of related data.

BACKGROUND OF THE INVENTION

Ever since computer systems evolved from research novelty to true business tools, one of the most important benefits of using computer systems has been their ability to store and provide access to large amounts of electronic data. Because data can be voluminous and complex, it typically must be organized in order to be useful. Early systems organized data in computer file systems that consisted of separate and unrelated files. These systems required data processing specialists to create custom application programs that could extract data from the files and place it into useful reports. There were a number of inefficiencies associated with storing data in file systems. For example, these systems often stored duplicative data that lead to data inconsistency. In addition, the file systems typically exhibited data dependence, which meant that any changes to a file in the file system required corresponding changes to every program that used that file. Soon computer programmers realized that management of file system data would be more and more difficult as the amount and the complexity of the data increased.

As a result, databases were created to store and manage data. A database is an organized collection of data. In contrast to the disparate and unrelated files of early file systems, databases stored data in a single data repository. Many different theoretical database constructs were proposed to solve the critical shortcomings of the early file systems. These theoretical data constructs may be referred to as database models. A database model is essentially a collection of logic that is used to represent the structure and relationship between data stored in a database.

Among the database models that achieved commercial success were the hierarchical model, the network model, and the relational model. The hierarchical model is based on a tree structure that is composed of root segments, parent segments and child segments. The hierarchical model describes a group of one-to-many (1:M) relationships between the parent nodes and the child nodes. The hierarchical model suffered from certain problems. Notably, the hierarchical data model lacked an ad hoc querying capability and was not adept at modeling many-to-many (M:M) relationships. More recently, the object-oriented database model has achieved some commercial success. The object-oriented model is loosely based on the hierarchical model in that it generally uses a hierarchical record structure.

The network database model was devised as a solution to some of the problems of the hierarchical model. It provided a standard data manipulation language (DML) for querying the database, and a data definition language (DDL) for defining the database. In spite of these improvements, the network model still suffered from the problem of structural dependence. Any change made to the database structure required that all schema definitions be revalidated before application programs could re-access the database.

The relational model, first developed by E. F. Codd in 1970 further addressed the problems identified above. It structured data logically into tables made up of rows and columns. Tables are hooked together via common attributes known as keys. A primary key is one or more columns in a first table that serve to uniquely identify a row in the table. A foreign key occurs when the columns of a primary key of a first table are present in a second table. Many of the commercial database management systems (DBMS's) of today are based on the relational database model. Examples of such systems are Oracle, DB2, Sybase, MS SQL Server, and MySQL.

A data definition language and a data manipulation language are typically provided for the relational model in the form of the structured query language (SQL). SQL is a database language that provides data definition services, data manipulation services and data query services. Using SQL, programmers are able to make changes to a relational database through the use of approximately thirty commands that are designed to work with any application that requires the manipulation of data stored in the relational database. SQL is a nonprocedural language which requires only that the programmer specify what must be done rather than how it must be done. In this sense, SQL is at a higher level of abstraction than many other programming languages.

One problem with the relational model is that different systems require different designs. Each time a new system is created, a person must create a database design consisting of tables and key values that are logically connected to the real world system that is being modeled. Further, integrating different relational databases can be a very difficult because of the infinite number of possible structures available for modeling real world data.

The inventors of the present invention perceived a need for a new, more pragmatic approach to database system development based on a single unified data structure. Accordingly, a new data model was developed that utilized a language-based data model with a finite set of data relations. This data model is referred to herein as a Metamodel. The Metamodel was created out of the recognition that the historical approach to computer database systems works from the basic assumption that no common structure to data exists. In other words, the historical approach started with the basic assumption that data must be structured in a design so that it may be useful to those that need to access the data. Thus, when complex data systems were designed, a custom database structure and design needed to be created to represent the relationships between the various data items stored in the system. As a result, different systems have different database designs.

In contrast to preexisting systems, the Metamodel approach recognizes that all data can be structured within a single database design. Rather than defining data in terms of tables and records (as is done by the traditional approach at the logical level), the Metamodel defines data in terms of units of meaning in a manner similar to how words are classified in the English language as nouns, verbs, adjectives, etc. As such, the Metamodel defines data in a propositional structure. The Metamodel approach differs from the traditional data modeling approach in that it is based on a data language that structures data at the conceptual level.

No matter what data model is utilized for storing data, the data will only be useful if it is readily accessible in a timely fashion to the people who make decisions based on the data. Thus, it is important (no matter what the underlying data model) that tools exist that provide the ability to reach desired data stored in the database. Known methods for accessing data stored in the database require extensive knowledge on the part of the user or developer. For example, in order to develop meaningful queries using SQL with a relational database system, a user or developer must know and understand three things: (1) the underlying data structure in the database; (2) the relationships between the various pieces of data that he wishes to retrieve; and (3) the proper syntax for writing the query in SQL. Accordingly, it would be an improvement to provide a way for users to easily extract relevant data from a database without having knowledge of the underlying structure, relationships, and programming language.

Further, in many database systems, security concerns are paramount. Certain users are allowed to access or modify certain data, but are forbidden from accessing or modifying other data. Often problems arise when users need access to data that they are permitted to see, but that data can only be compiled or calculated through the use of data that they are not entitled to access or modify. Thus, it would be an improvement to provide a security model which allows users to effectively retrieve data from a database without having knowledge of their permissions or restrictions on the database.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a general purpose semantic search engine that allows users to easily define data dependency paths through a body of semantically related data. A first aspect of the invention provides a method for defining a data dependency path based on a data model that represents data in terms of units of meaning and relationships between them.

A second aspect of the invention provides a method for defining database security that allows for users to create views based on secured data without actually providing access to the secured data. The method includes defining a security code for each data element number, data versions, data relations, data dependency paths, data views, and databases, and based on that security code, allowing users to access instances of data elements. The use of this security code allows for dynamic security on database queries.

A third aspect of the invention provides a method for implementing alert profiling wherein a user can define certain parameters such that if data is entered into the database that matches those defined parameters, a notification is sent to the user.

A fourth aspect of the invention provides a method of storing a Metamodel universe in a relational database management system. A Metamodel universe is reduced to one or more tables in the relational system according to the grammar as defined in the Metamodel data relations.

A fifth aspect of the invention provides a rapid application development technique that allows a user to model data more quickly. A user determined input/output display is created that allows the user to define forms to input data. According to the method, the user is given the ability to define his own data universe.

A sixth aspect of the invention provides a method of parallel processing. A data dependency path branches at either a data element level or a data element value level. Multiple copies of the same data access program are launched and operate on each branch in parallel. The structure of the data dependency path keeps the data access programs from interfering with each other.

A seventh aspect of the invention provides a method for automatically creating a data structure based on a defined data dependency path. The method includes selecting data elements, defining a data path through the elements, utilizing normalization rules to convert the data path into a data structure, and populating the data structure using the data access path.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 4 illustrates a chart that describes logical operators that may be used to practice aspects of the present invention.

FIG. 5 illustrates the 5 tuples and 28 data relations that make up the Metamodel that may be used to practice aspects of the invention.

FIG. 10 illustrates a user interface in which a user selects one or more data views according to one or more aspects of the invention.

FIG. 18 illustrates an example of a relational database table that stores data from a Metamodel according to one or more aspects of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
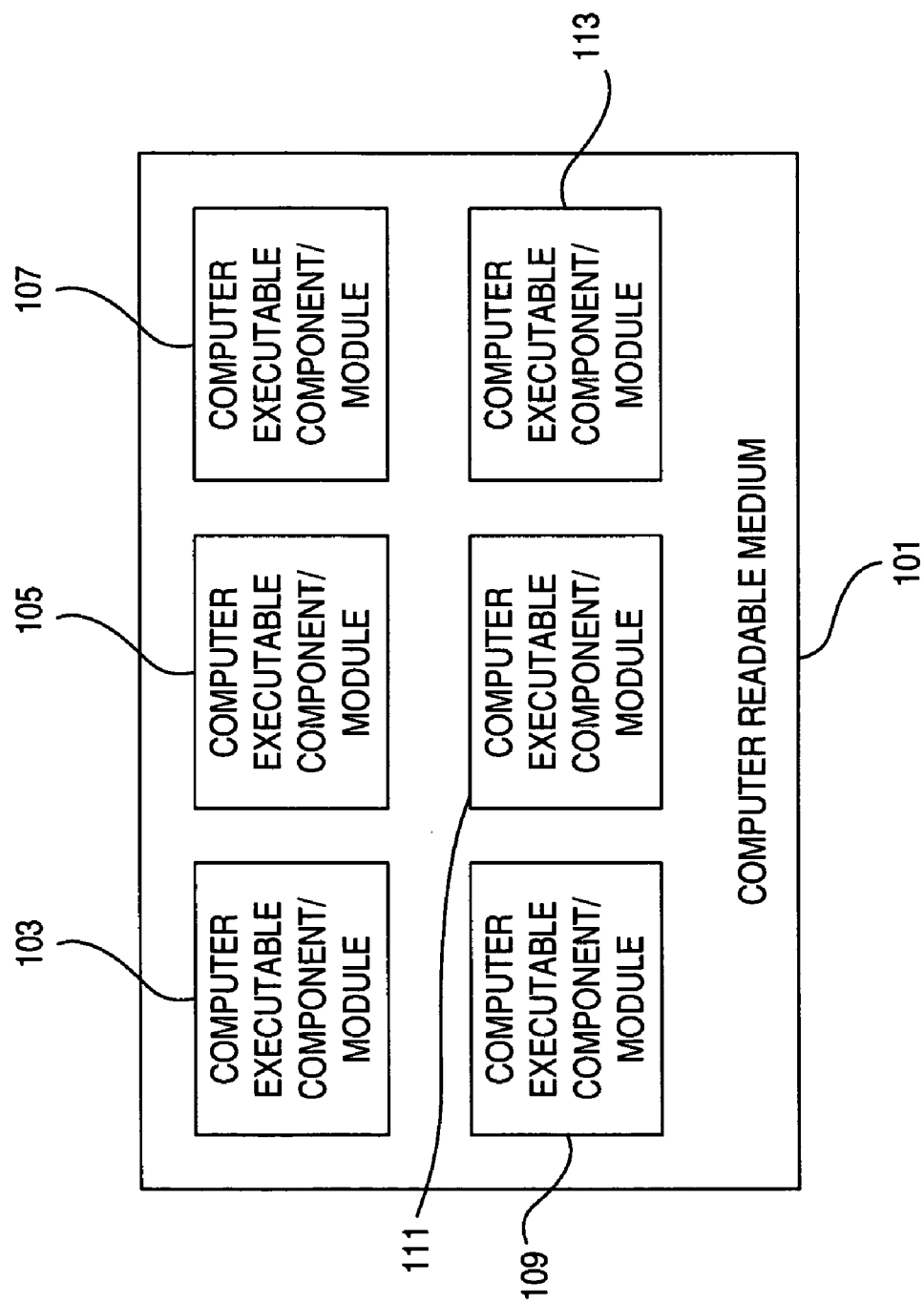
FIG. 1 illustrates a computer readable medium on which may be stored embodiments of the present invention.

The inventive methods may be embodied as computer readable instructions stored on a computer readable medium such as a floppy disk, CD-ROM, removable storage device, hard disk, system memory, computer chip such as an application specific integrated circuit (ASIC), or other data storage medium. FIG. 1 illustrates a block diagram of a computer readable medium 101 that may be used in accordance with one or more of the above described embodiments. The computer readable medium 101 stores computer executable components, or software modules, 103–113. More or fewer software modules may alternatively be used. Each component may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

Figure 2:
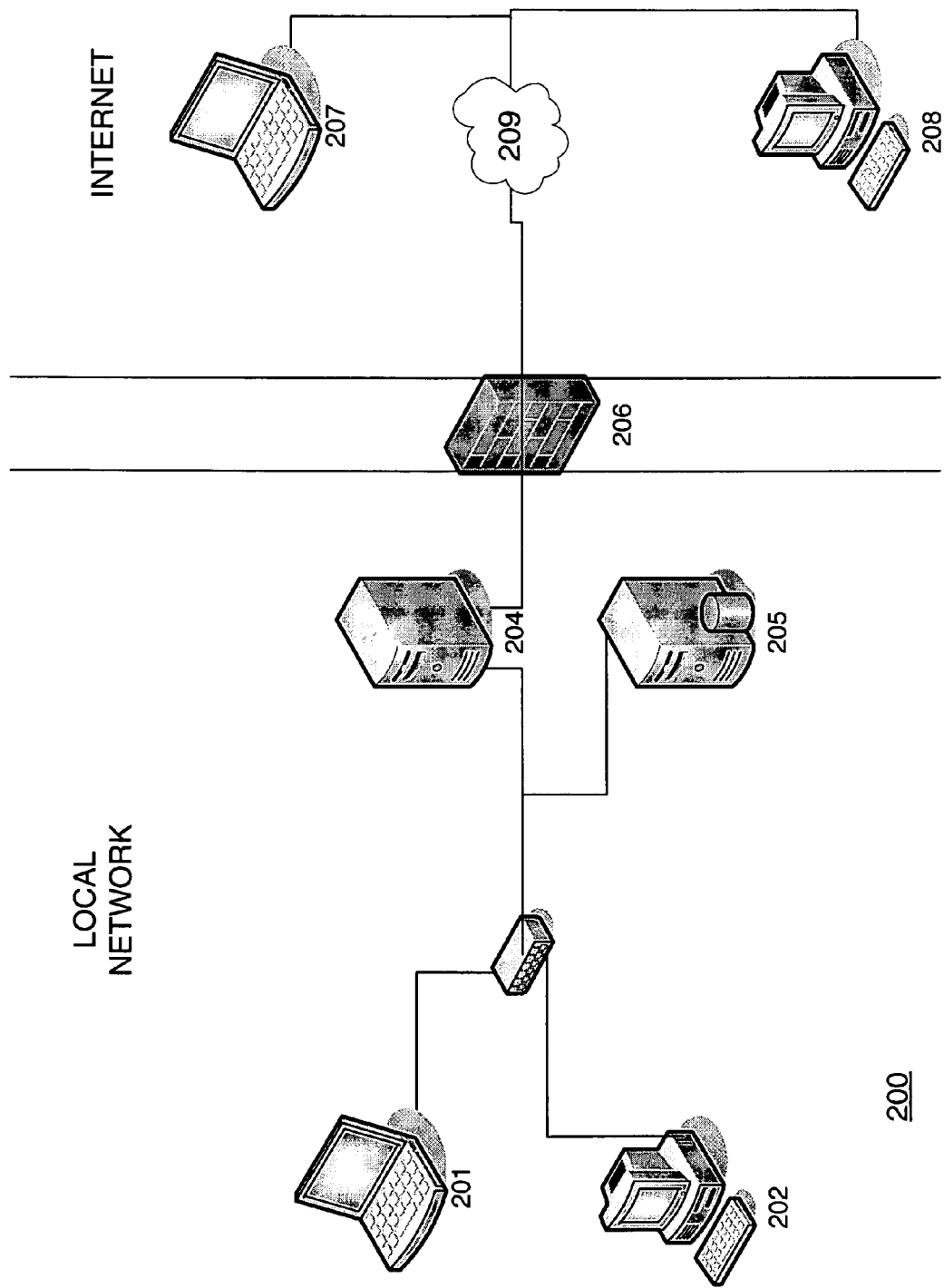
FIG. 2 illustrates a computer network environment suitable for practicing aspects of the invention.

The inventive methods may be practiced in a standalone environment or a networked environment such as the illustrative networked database environment 200 described in FIG. 2. Network 200 represents only one of many suitable networked database environments for practicing the present invention. A suitable database environment may include a client portable computer 201 such as a laptop computer, notebook computer, handheld computer, or some other portable computer known in the art operably connected to a network through networking components 203 such as a networking cards, switches, hubs, or routers. The environment 200 may also include a personal computer 202, also operably connected to a network through networking components 203. Also connected to the same network may be application server 204 which may house application programs that are suitable for practicing aspects of the present invention. Database server 205, which may store a database, data model and database management system (DBMS) suitable for practicing aspects of the invention, is also connected to the local network. At the edge of the local network, a firewall 206 may divide the local network from a wide area network 209 such as the Internet. Internet connected portable computers 207 and personal computers 208 may access application server 204 and database server 205 via wide area network 209 and through firewall 206.

One or more embodiments of the present invention may be practiced using the Metamodel as the underlying data model. Although the embodiments described herein are described in connection with the Metamodel, one of ordinary skill in the art would readily understand that a number of alternative data models may be used to practice the invention.

The data model ties human thinking with computer processing. It provides a blueprint for the design and implementation of databases and applications that utilize the databases. Data models address three distinct order of data structure: conceptual, logical and physical. Conceptual data structure focuses on and involves the use of language to convey meaning. Common languages such as natural language (i.e. English), mathematics, and computer programming language are inadequate for expressing conceptual data structure. English is too complex and imprecise to be used as a basis for data structure. Mathematics is too limited, addressing only a small class of data. Traditional computer programming languages are likewise inadequate for expressing conceptual data structure, as they are typically a hybrid creation of natural language and mathematics with added logical and physical data structure components.

The conceptual data structure is, in essence, the human understanding of what is being modeled. If someone is asked what needs to be stored in a database, the English language response would describe the conceptual structure. For example, if someone were asked what should be stored in an e-commerce system database, the answer might be: "The system needs to keep track of all of the products offered for sale. It also needs to track inventory levels for each product so that the seller does not sell product that it does not possess. The system also needs to store buyer information such as name, address, phone number, etc., and also needs to keep track of orders placed in the system, including which products were included in which order, and who placed the order." This statement is an example of a conceptual data structure.

Logical data structure focuses on how relationships between data are maintained during computer processing. Traditional data models such as the relational model, the object oriented model, and the network model can be considered as implementing logical data structure. The logical data structure refers to how a database management system implements a described conceptual data structure. For example, the conceptual data structure of the e-commerce system described above could be implemented as a relational database, a network database, a hierarchical database, or some other database type. Each of these data model types presents a different logical data structure that models the same conceptual data structure.

Figure 3:
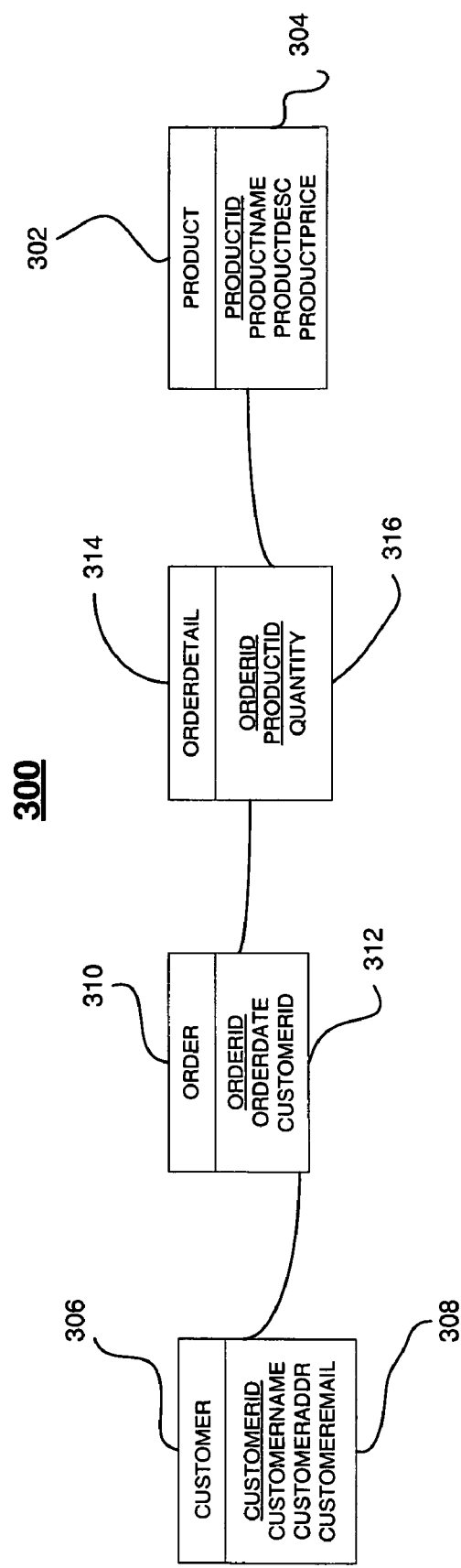
FIG. 3 illustrates a typical depiction of a simple relational data model as is known in the prior art.

With reference to FIG. 3, according to the relational model, a database model 300 of the conceptual online store described above might contain a product table 302 that stores product information 304, a customer table 306 that stores customer information 308, an order table 310 that stores information about orders 312 that have been placed on the system, and an order detail table 314 that stores information about each order 316. Each of these tables would be related in some way to one or more of the other tables. This particular design would be just one of many possibilities, however. There are many different ways that this conceptual structure could be logically structured as a relational database. In other words, the same conceptual data structure can be logically modeled in many different logical forms.

Two different conceptual data models would likewise require significantly different logical data structures. For example, a relational database model (i.e. logical data structure) of an online student records database would look very different from the online e-commerce relational database model. The student records database might have a student table that stores information about students, a course table to store information about courses offered at the school, an enrollment table that stores information about the courses that students are enrolled in, and a teacher table to store information about teachers.

Just as the same conceptual structure can be implemented using various logical data structures, a single logical data structure may be implemented using many different physical data structures. Database developers typically think in terms of conceptual and logical data structure—they are not generally concerned with how the data is physically stored. Computer systems, on the other hand, are concerned only with logical data structure and physical data structure. Thus, it is logical data structure that forms a tie between human thinking and computer technology.

The Metamodel data model allows the system designer to define a conceptual structure that is automatically converted to one or more logical structures and/or physical structures. This methodology provides an improvement over traditional database development, wherein designers first were required to devise a conceptual data model and then manually convert it to a logical data model. The Metamodel alleviates the need for this second step by working only at the conceptual level. It then allows automatic conversion of the conceptual data structure into a logical data structure which is then processed by the computing system into a physical data structure.

The Metamodel Approach

The Metamodel approach eliminates much of the effort associated with database design. The Metamodel approach says that all data can be structured within a single database design. Thus, much of the effort associated with designing a data structure to accommodate the real world data will be eliminated. The Metamodel approach is different from the traditional database approach in that it is based on a data language that structures data at the conceptual level. Rather than defining data in terms of tables and records (as is done by the traditional approach—at the logical level), the Metamodel defines and structures data in terms of units of meaning in a manner similar to how words are classified in the English language as nouns, verbs, adjectives, etc.

The English language is made up of thousands of words. In order to communicate effectively using the English language, it is not enough to know the words and what they represent. An understanding of English grammar is also necessary. In other words, one must understand how to combine the words properly in order to convey meaning. For example, consider the following sentence: "likes Peter Jane." It has no meaning because it is not a complete sentence; it does not use proper grammar. In English, grammar structures our words so that they can convey meaning: "Jane likes Peter." Words are classified in order to provide an understanding of how they should be used. For example, words are classified as nouns, verbs, adjectives, adverbs, prepositions, etc. Word classification, combined with rules of grammar (i.e. subject-verb-object), allows one to convey meaning through the use of expression.

In a similar way that grammar helps organize words so that they can effectively convey meaning, the Metamodel structures data and their interrelations. The Metamodel, however, recognizes that the complexities of natural language are difficult to accurately model. An English language sentence may be comprised of a subject which describes the actor (Jane), followed by a verb which describes the action (likes), followed by an object which describes the recipient of the action (Peter). The verb can be characterized as describing how the subject relates to the object. Although a simple sentence is fairly easy to model, the English language has many other grammatical constructs that can be used in many other different kinds of ways. For example, consider the sentence "I traveled to the store to purchase a bucket of apples." This sentence includes a subject (I), a verb (traveled), a prepositional phrase (to the store), an infinitive (to purchase), a direct object (a bucket) and another prepositional phrase (of apples). The human brain is able to easily comprehend and understand how all of these parts fit together. Such intelligence, however, is not easily programmed into a computer. As a result, any grammar that is implemented using computer language must be simple, with limited available constructs.

Data Identification

The Metamodel addresses three interdependent components of conceptual structure: identification, classification, and relationship. Data identification is the representation or modeling of individual units of meaning as data elements. A data element is the unit of meaning attributed to a piece of data. Modeling units of meaning differs from modeling units of notation, the latter of which is typically how data is modeled in traditional database systems. The Metamodel recognizes that a word is a representation of something, not the thing itself. For example, the computer that this document was created on may have several different units of notation such as notebook computer, laptop computer, personal computer, etc. However, each of these notations refers to the same unit of meaning—the computer that created this document.

The Metamodel assigns each data element (i.e., each unit of meaning) a data element number (DEN) for notational purposes. Any different number of names can be associated with a DEN—so long as these names are have the same meaning. For example, a DEN with value 0003 may have the following description: "A given point in time as identified by a calendar day." This DEN 0003 may have the following names associated with it: Date, Reference Date, Order Date, Sale Date, Expiration Date, etc. Each of these names refers to the same meaning—a given point in time as identified by a calendar day.

The Metamodel also allows for data elements to be expressed in different ways through the use of versioning. For example, version 1 of DEN 0003 might have a format such as "Jun. 1, 2004" while version 2 of the DEN 0003 might have the format "Jun. 1, 2004". Nevertheless, even though these two versions are expressed differently, they mean precisely the same thing and are thus accorded the same DEN.

Data Classification

The Metamodel breaks all meaningful data down into one of three functional classes: identifiers (I), modifiers (M), and descriptors (D). Meaningful data refers to anything that needs to be stored in the system. Typically, the things that are stored are people, places, things or something that describes a person, place or thing. Each independent piece of data stored in the system is called a data item. Each data item, therefore, will be an I, an M, or a D.

An identifier is a primary identification term that is used to uniquely identify things, events, or classes of things or events. Basically an identifier is a real world entity that is to be modeled in the database. Conceptually, the identifier is used to answer the question: What is it? For example, in the case of an e-commerce database these might be identifiers: customer, product, order.

A modifier is used to answer the question: Which thing? A modifier does not stand alone, but is used in conjunction with an identifier to uniquely identify the variation of the identifier with which it is used.

A descriptor answers the question: What is known about this particular thing? Descriptors are non-identification data elements that are used to characterize entities. They describe but do not identify.

To provide a concrete example using the e-commerce database model described above, consider "a customer" in terms of the Metamodel. First, ask the question: what is this thing? A person who makes a purchase on the web site. This unit of meaning is assigned the DEN 0001 and the name Customer. The Metamodel now reflects that there are customers, but can it differentiate between various customers? Rather how does it know which customer? A data value is hooked to the identifier.

A modifier is a variant of an identifier. It is used to handle multiple occurrences of like items that may be associated with an instance of an identifier (e.g. serial numbers on airplanes, revision numbers of documents, etc). Suppose the unit of meaning "a particular point in time represented by a calendar date" is represented as DEN 0002 and given the name DATE. Combining DEN 0001 as an I with DEN 0002 as an M, results in a data relation (IM) that means "a customer at a particular point in time represented by a calendar date."

The next question that logically arises asks what is known about this particular customer? In order to provide this answer, descriptors are associated with the IM combination from above to create an IMD relation. These descriptors may include items such as Name, Address, Phone Number, etc. Thus, the phone number of a customer at one point in time could be differentiated from the phone number at another time. This distinction is useful in cases where a customer changes their phone number. The descriptor items cannot uniquely identify any customer, but rather serve only to describe an already identified customer.

Data element numbers (DENs) may be expressed in terms of how they relate to one another through the use of logical operators. The use of logical operators allows these relationships to be expressed in precise terms, replacing the many different relationships between subjects and objects that are provided through the use of verbs in the English language. The Metamodel uses three logical operators: =, <, and >. Any number of different words may be used when referring to the use of logical operators. For example, the chart shown in FIG. 4 shows how logical operators might be referred to in a data relation.

Referring to FIG. 5, the data relations of the Metamodel are provided. There are two basic types of data relations, simplex and complex. Simplex data relations are composed of data elements pertaining to one entity—only one identifier. There are only 4 such data relations; I, ID, IM and IMD. There may be any number of ID, IM and IMD data relations associated with any one I. For example, the meaning represented by the IMD data relation involves three data elements. The D has meaning as it applies to the meaning of the IM and the M has meaning as it applies to the meaning of the I. A simplex relation may be interpreted into natural language as a "has a" or a "with a" relationship. For example, upon combining an Identifier meaning "a health plan member" with a Descriptor meaning "a blood pressure measurement", the simplex data relation ID may read "a health plan member has a (or with a) blood pressure measurement." Adding a further level of complexity, if a Modifier with a meaning of "a point in time as identified by a calendar date" is added, the resultant simplex relation IMD may read as "a health plan member on a particular date has a blood pressure measurement."

Complex data relations result from the interdependency of two different entities or two separate occurrences of the same entity. One identifier represents the primary entity, or subject, and the other represents the related entity, or direct object of the relationship. It is possible to have 5 different data elements along with the logical operator participating in one data relation. This creates a semantically rich data model capable of representing considerable knowledge. Because the Metamodel uses only 3 functional categories of data (I, M, and D) and 3 logical operators (=, >, <), they can be structured in a finite number of ways—28 in the case of the Metamodel. All data relations used by the Metamodel are shown in FIG. 5. As shown, 12 of the data relations have logical opposites. For example, the opposite of $I_1M_1>I_2$ is $I_2<I_1M_1$.

Principles of the Metamodel were taken from English, mathematics, general semantics, and computer programming language. The concepts of parts-of-speech that are found within the model were taken from natural language. The use of logical and Boolean operators was taken from mathematics. Data typing, domain specification and integrity maintenance were derived from computer programming language. Other remaining elements of the model were derived from general semantic theory.

Figure 6:
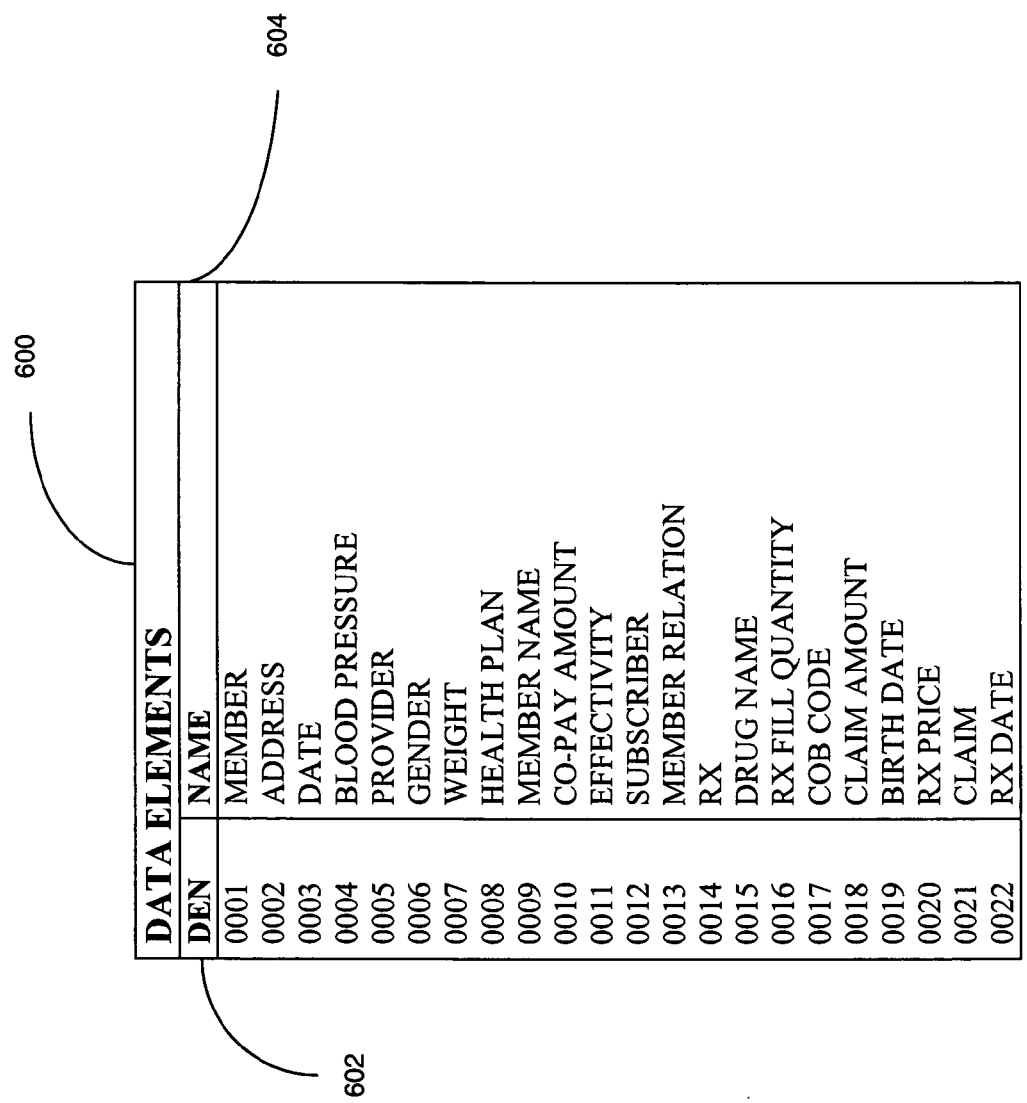
FIG. 6 illustrates a list of data elements in a Metamodel of a simplified health care system that may be used in practicing aspects of the present invention.

Referring now to FIG. 6, a list of data elements 600 is provided that could be used in a Metamodel of a simple health care database. The list includes a column for the data element numbers (DENs) 602 and the names 604 given to the each DEN. For example, the DEN 0001 is named "member" which is an arbitrary term, because DEN 0001 can be given any of many different names. What truly matters is that whatever the name given to DEN 0001, it refers to the same unit of meaning (i.e. the same thing). It is from these data elements that the Metamodel will be constructed.

Figure 7:
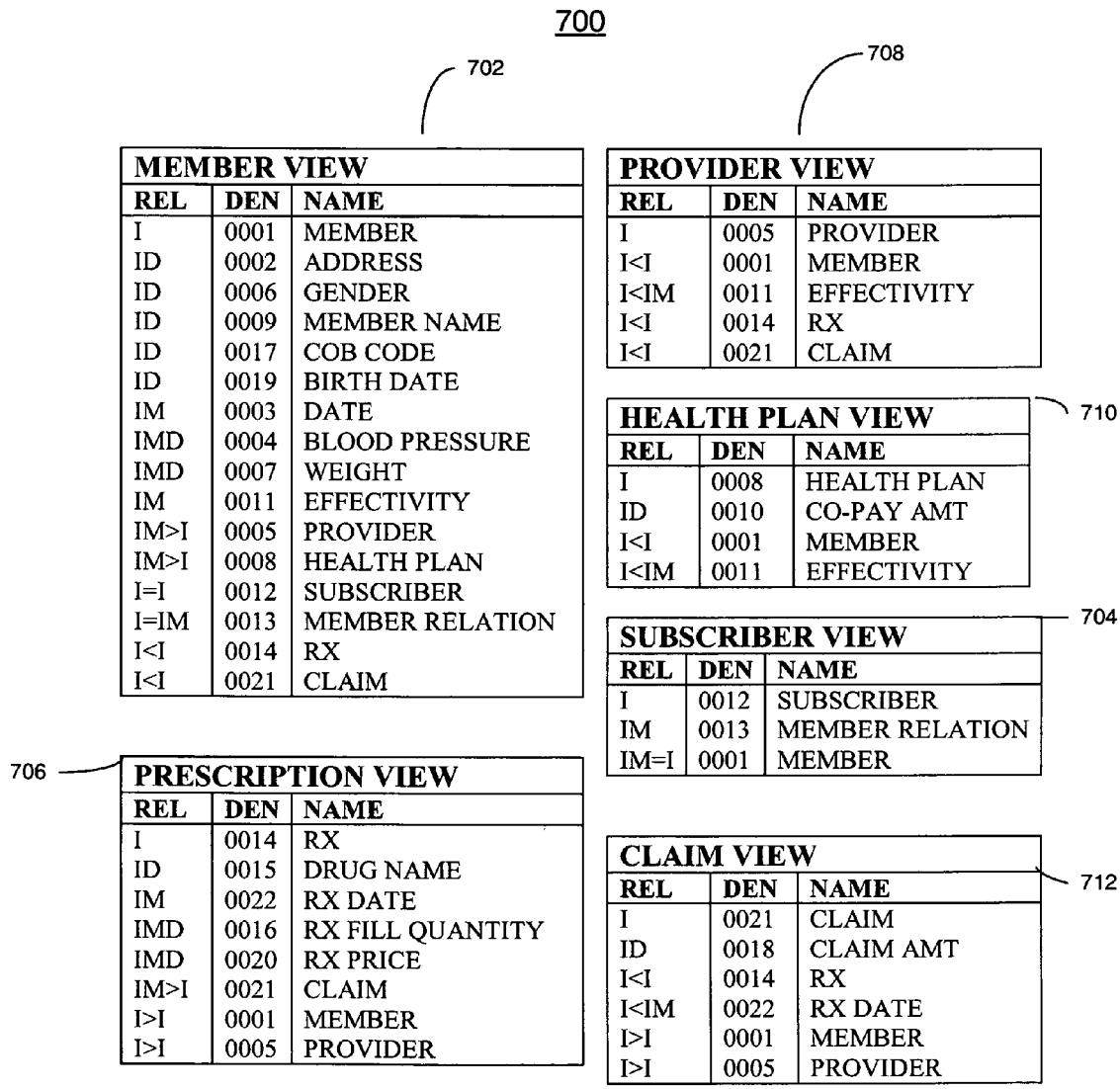
FIG. 7 illustrates an example of a Metamodel for the data elements listed in FIG. 6.

Referring to FIG. 7, a top-level representation of a Metamodel that models the data elements from FIG. 6 is provided. This Metamodel has six distinct views that represent six entities in the system. Member view 702 is a set of data relations that relate to a member in the health care plan. Subscriber view 704 provides a set of data relations that describe a subscriber in the system. Prescription view 706 provides a set of data relations that relate to prescriptions. Provider view 708 is a set of data relations that relate to a health care provider such as a doctor or a physicians group. Health plan view 710 is a set of data relations that relate to a health plan. Claim view 712 contains a set of data relations that relate to medical claims submitted by members of the health plan. While each view in FIG. 7 is drawn from a single Identifier, a view may be comprised of any combination of DENs and DEN relations drawn from one or more Identifiers.

By way of example and not limitation, a sample detailed data model will now be described and a data dependency path will be calculated according to one or more embodiments of the present invention. To better illustrate the semantic nature of the Metamodel, the following chart provides a detailed description of each data element in the sample list of FIG. 6. The following chart includes the DEN (data element number) for each element, its description (i.e., its meaning), any names given to it, and the versions of possible instances of the data element and each version's corresponding format. Each data element may have more than one name given to it, and one name may apply to more than one data element. The Metamodel allows for data elements to have any number of names, so long as they refer to the same unit of meaning (as provided in the description).

| DEN: | 0001 | Description: | A Social Security Number plus a Relation Code that describes a health care plan subscriber and their dependents. |
|---|---|---|---|

Names: MEMBER
Version Format
1 #########-##, e.g., '123456789-10'
2 ###-##-####-##, e.g., '123-45-6789-10'

| DEN: | 0002 | Description: | A postal address. |
|---|---|---|---|

Names: ADDRESS
Version Format
1 '1234 Anywhere Blvd., Washington, DC 20001'
2

| DEN: | 0003 | Description: | A given point in time as identified by a calendar day |
|---|---|---|---|

Names: DATE
Version Format
1 '20040101'
2 'January 1, 2004' (NOTE: Different data types may be supported by different versions)

| DEN: | 0004 | Description: | A blood pressure reading. |
|---|---|---|---|

Names: BLOOD PRESSURE, BP
Version Format
1 '120/80'
2 '120 over 80'

| DEN: | 0005 | Description: | An person or group that provides health care services. |
|---|---|---|---|

Names: PROVIDER, PHYSICIAN'S GROUP
Version Format
1 'Dr. Smith'
2 'Tri-State Orthopedic Services'

| DEN: | 0006 | Description: | Gender. |
|---|---|---|---|

Names: SEX, GENDER
Version Format
1 'F'
2 'MALE'

| DEN: | 0007 | Description: | A measurement of mass. |
|---|---|---|---|

Names: WEIGHT, MASS
Version Format
1 '150 lbs.'
2 '80 kg.'

| DEN: | 0008 | Description: | A health care plan offered by a health care company |
|---|---|---|---|

Names: HEALTH PLAN
Version Format
1 ####, e.g. '1234'

| DEN: | 0009 | Description: | The name of a member. |
|---|---|---|---|

Names: MEMBER NAME, NAME
Version Format
1 FNAME LNAME, e.g. 'John Smith'
2 LNAME, FNAME, e.g. 'Smith, John'

| DEN: | 0010 | Description: | A dollar amount of a co-payment. |
|---|---|---|---|

Names: CO-PAY AMT, CO-PAY, Co-payment Amount
Version Format
1 '$1.99'

| DEN: | 0011 | Description: | A range of dates with a beginning date and an ending date. |
|---|---|---|---|

Names: EFFECTIVITY
Version Format
1 '01/01/03 - 01/01/04'

-continued

| DEN: | 0012 | Description: | A Social Security Number that identifies a health care plan subscriber that is the primary account holder. |

Names: SUBSCRIBER, PRIMARY ACCOUNT HOLDER
Version Format
1 #########, e.g., '123456789'
2 ###-##-####, e.g., '123-45-6789'

| DEN: | 0013 | Description: | A code that describes relationships between family members. |

Names: MEMBER RELATION; RELATIONSHIP CODE
Version Format
1 '10'
2

| DEN: | 0014 | Description: | A prescription of a drug. |

Names: PRESCRIPTION, RX
Version Format
1 ##########, e.g. '0000000234'
2

| DEN: | 0015 | Description: | A name of a drug. |

Names: DRUG NAME
Version Format
1 'Penicillin'
2 ' '

| DEN: | 0016 | Description: | A quantity of a prescription. |

Names: RX FILL QUANTITY
Version Format
1 '300 mg 2 BID'
2

| DEN: | 0017 | Description: | An indicator of whether a member was multiple insurance companies requiring a coordination of benefits. |

Names: COB CODE
Version Format
1 '0010'
2

| DEN: | 0018 | Description: | An amount of money requested in a claim. |

Names: CLAIM AMOUNT, CLAIM AMT
Version Format
1 '$20.53'
2

| DEN: | 0019 | Description: | Point in time that a person was born as identified by a calendar day. |

Names: BIRTH DATE, DOB
Version Format
1 '1964-04-02'

| DEN: | 0020 | Description: | The price in dollars that a prescription costs. |

Names: RX PRICE
Version Format
1 '$100.00'

| DEN: | 0021 | Description: | A request for payment made by a member to a health plan company. |

Names: CLAIM
Version Format
1 '0120340'

-continued

| DEN: | 0022 | Description: | The point in time that a prescription was filled as identified by a calendar day. |

Names: RX DATE
Version Format
1 'January 2, 2004'
2 '2004-01-02'

Referring now to FIGS. 8(a)–(f), a detailed description of the Metamodel of the sample health care system is provided for each of the six views called out in FIG. 7. Each of the data relations is described according to the grammar as defined in the Metamodel. Each data relation in the view has a corresponding Metamodel tuple 820, DEN 830, an arbitrary name 840 (the name is secondary to the meaning it conveys), six columns 850 indicative of the views in which the DEN participates, and an English language description 860 of the data relation.

FIG. 8(a) provides the description for the Member View 702. The view has a base I with a DEN 0001 which refers to a member. Each of the six columns has an asterisk indicating that DEN 0001 participates in a data relation in each of the six defined views in this Metamodel. The second data relation listed, ID:0002:ADDRESS, means "a member has an address." The third data relation listed ID:0006:GENDER, means "a member has a gender." Neither of these two DENs participate in data relations in any other views, thus, only the first column has an asterisk. Each of the remaining data relations in Member View 702 is fully described in FIG. 8(a).

Figure 8D:
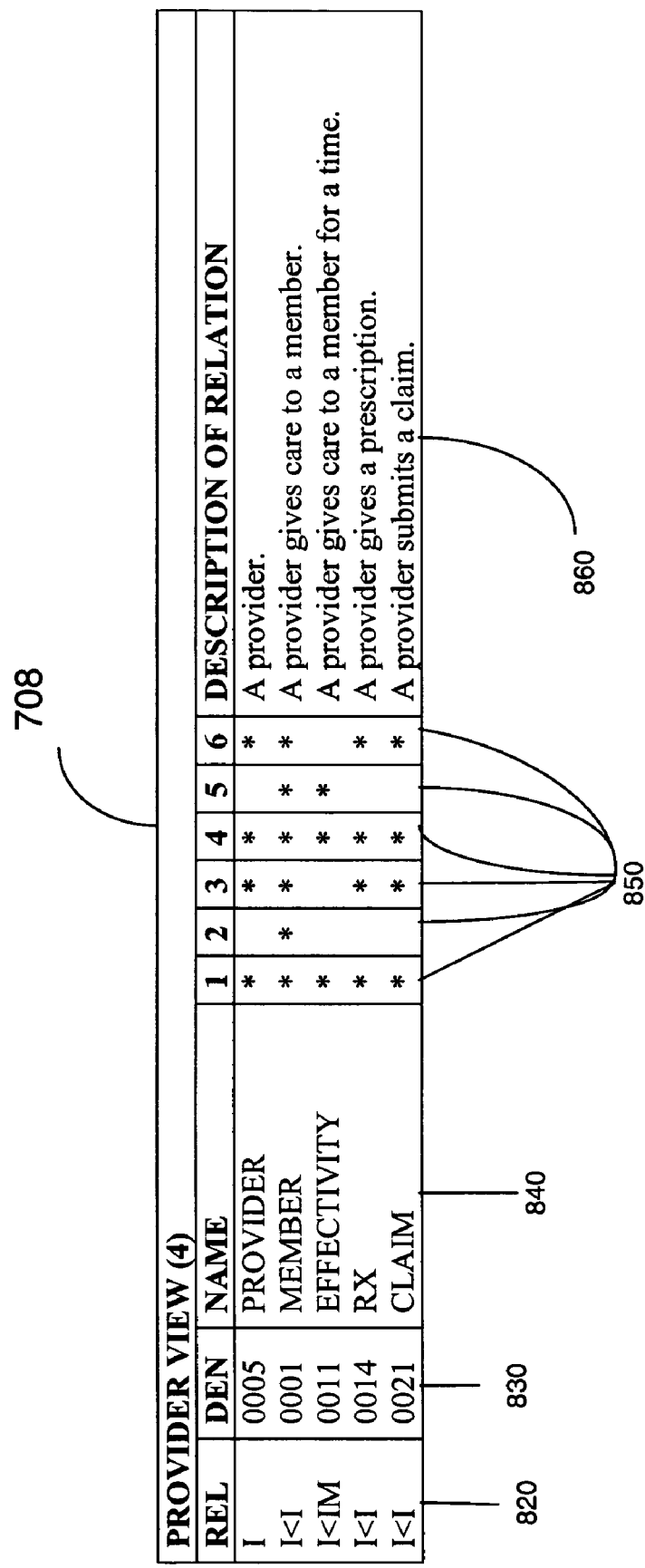
FIG. 8 illustrates a detailed example of the Metamodel from FIG. 7.
Figure 8E:
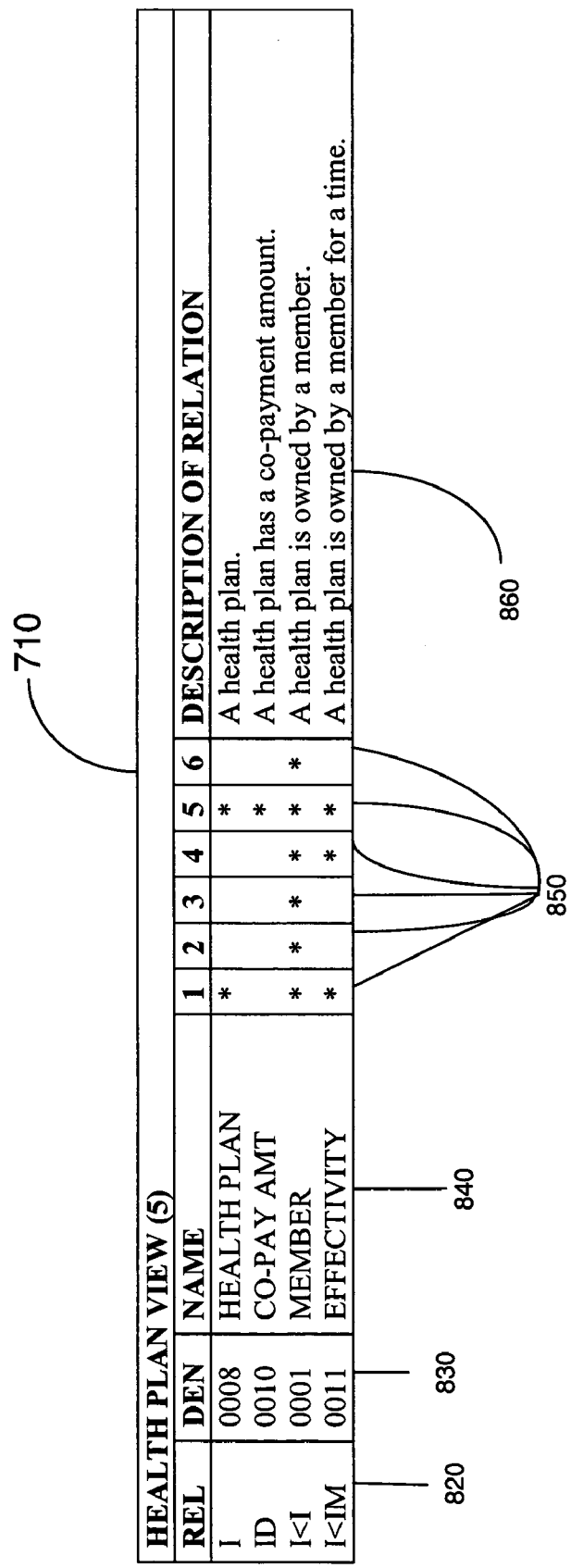
Figure 8F:
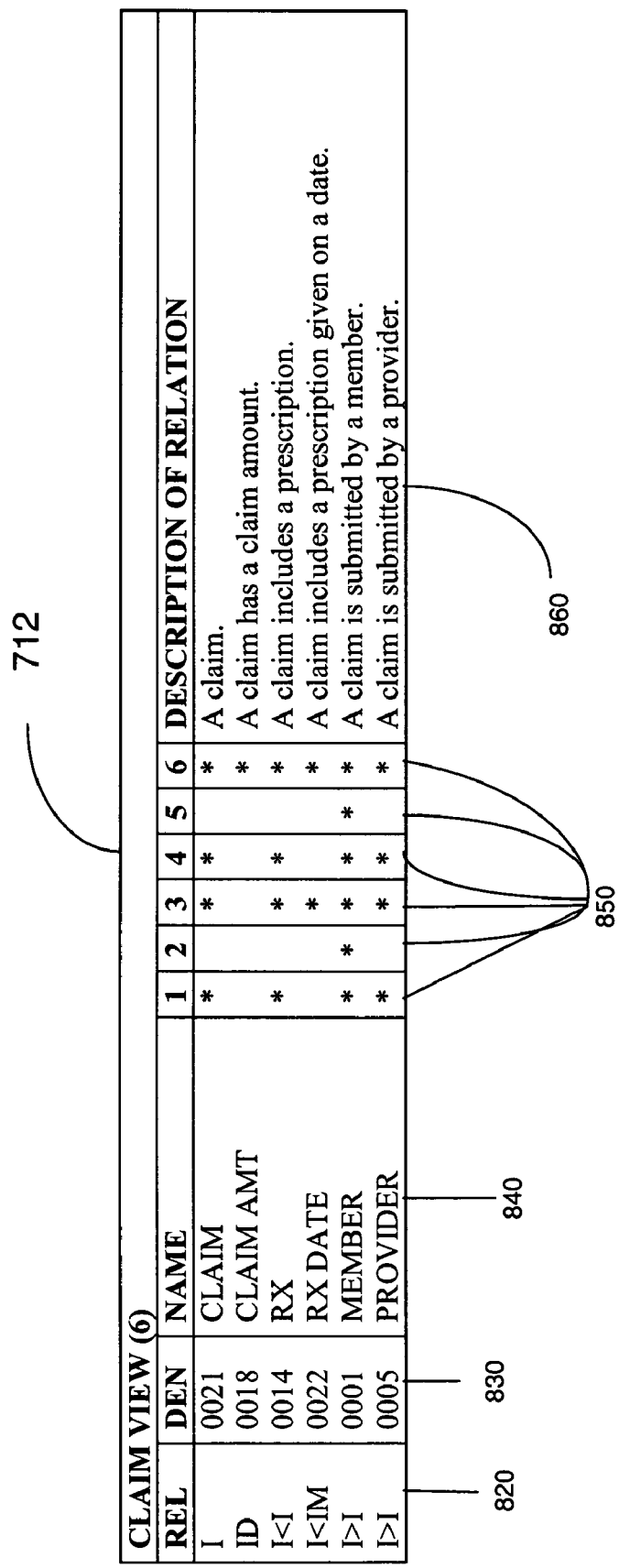

FIG. 8(b) provides the description for Subscriber View 704. It includes an identifier I:0012:SUBSCRIBER which refers to a subscriber. As shown above in Table 1, a subscriber is a primary account holder while a member may be a subscriber, or a familial relation (i.e. husband, wife, child, or other dependent) of the subscriber. Thus, the data relation IM:0013:MEMBER RELATION is placed in the subscriber view. This data relation reads "a subscriber with a membership code." Columns 1 and 2 have asterisks in them, indicating that DEN 0013 participates in data relations in these two views. The next data relation is a complex data relation IM=I. The IM=I:0001:MEMBER data relation reads "a subscriber with a member relationship code is how we identify a member." Modeling the data in this way allows the system to uniquely identify a person authorized to receive medical care while still knowing by inspection who is the person paying for the care (i.e. who the primary account holder is). The remaining views Prescription View 706, Provider View 708, Health Plan View 710, and claim View 712 are each described in FIGS. 8(c)–8(f), respectively.

Using the Metamodel described in Table 1 above and in FIGS. 6, 7 and 8, an example is now provided of how aspects of the present invention may be applied to the above described model in order to calculate a data dependency path through the Metamodel. Although this embodiment of the present invention is described using the Metamodel, one of skill in the art would readily appreciate that any data model that describes data using a finite set of data relations could be used to practice the present invention. The use of a Metamodel is merely illustrative and not intended in any way to be limiting the scope of the invention.

Figure 9:
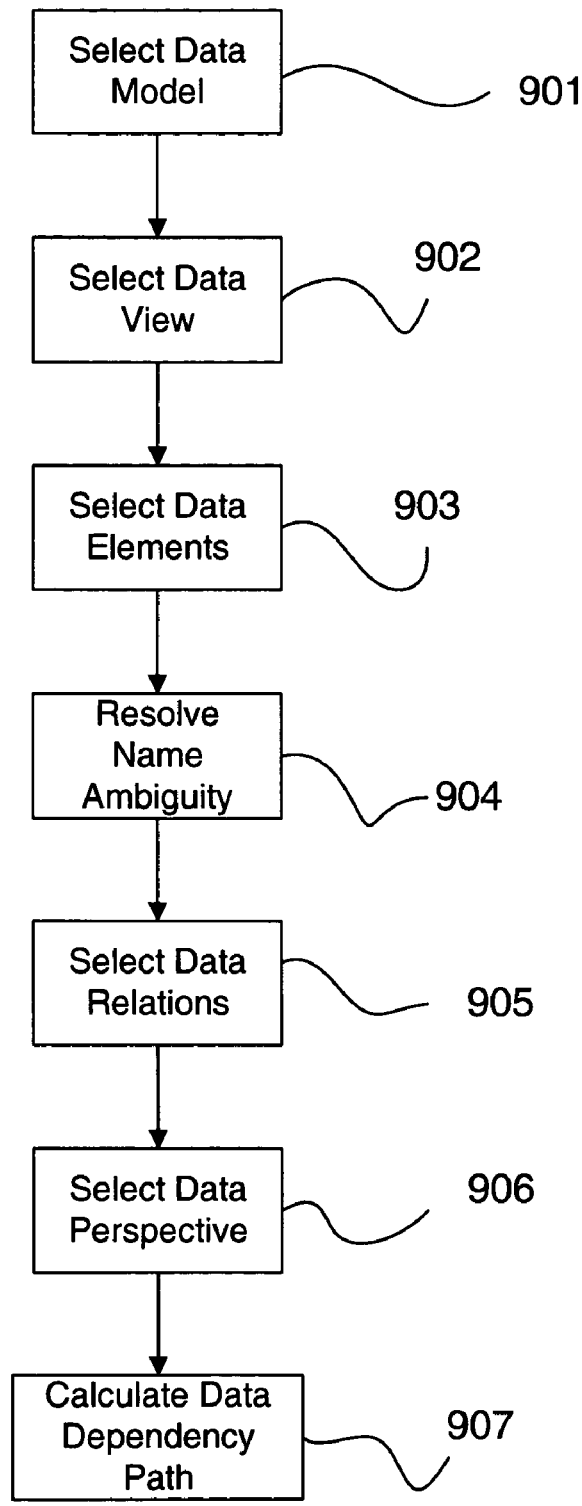
FIG. 9 generally illustrates a method for creating a data dependency path according to aspects of the present invention.

Referring now to FIG. 9, a functional flow diagram is provided that shows the steps for calculating a data dependency path according to the semantic search engine of the present invention. Recalling that semantic search engine allows users to easily define data dependency paths through a body of semantically related data, the scope of the semantically related data (i.e. a search domain) must first be determined. Accordingly, at step 901 a data model is selected. The selected data model is used as the initial, unrefined search domain. In one embodiment, the model may be a Metamodel such as the one described above. In other embodiments, the model may be some other data model that defines data at the conceptual level in terms of a finite set of data relations rather than the logical or physical level.

At step 902, one or more data views is/are selected. This selection may be made by a user, or in other embodiments it may be selected by the system. A data view is the collection of data elements that make up an entity (i.e. a thing represented) in the data model. More precisely, a data view is a set of data elements together with the data relations in which these elements participate. All of the data elements and data relations within a given data view are semantically connected. Thus, it is possible to connect any single data element with any other data element (provided that they are in the same data view) in a meaningful fashion. As previously discussed, in the Metamodel, a data view is represented by one or more Identifiers and the data relations associated with it/them. For example, referring back to FIG. 7, the member view 702, subscriber view 704, prescription view 706, provider view 708, health plan view 710 and claim view 712 each represent a data view that could be selected for search. The purpose of selecting a data view is to specify the scope of the search within the search domain. More than one view may be selected to create a single unified data view. Generally, a data search considers a subset of the data in the selected data model as defined by the selected data view. The data view serves to limit the data elements and data relations that can be used in the data search. If no data view is selected, the entire selected data model (which is the initial search domain) remains the effective search domain.

If multiple data view(s) are selected, their respective data elements are merged, creating a single unified data view. This merger results in a Cartesian product of the various data sets that eliminates duplicate data elements and data relations. The data views need not necessarily come from the same application system. They can span multiple different systems as long as each of the systems is included within the same Metamodel. Each of the multiple systems is accessible because each system may be mapped to the same Metamodel. Once the desired data view has been selected, the process of data element selection begins.

Referring further to FIG. 10, an example of a user interface screen is shown that may be used to select a desired data view from Metamodel 700 of FIG. 7. Although the example shows a Windows® application interface, it would be appreciated by one of skill in the art that this invention could also be practiced in the context of a general Internet browser or even a specialized semantic browser. Data view selection menu 1010 provides a list of the various views available for selection along with a checkbox next to each available view. The user may select the desired data view by placing a check in one or more of the checkboxes corresponding to the desired views. In the example presented in FIG. 10, the checkboxes corresponding to member view 802, prescription view 806, and claim view 812 have been selected. Once the data view has been selected, the data name/element selection menu 1020 is populated with the Cartesian product of the data elements in the selected data view.

Next, at step 903, data element selection takes place. It is in this step where the user or system selects the data elements that will result in returned data. Each data element that participates in the selected data view is displayed to the user for selection. The display may include the data element number DEN, or it may include only a name given to the data element, or it may include both the DEN and a given name. The user or system then selects desired data elements from the displayed list.

Referring again to FIG. 10, an illustration of an interface suitable for data element selection is shown in data element selection menu 1020. The data element number (DEN) is displayed in a first column 1021. The data element name is displayed in a second column 1022. In the example shown, each data element has a checkbox 1023 next to it for selection. The user selects each of the data elements that he desires and then clicks submit button 1026. Clear button 1024 allows all of the checkboxes to be cleared for reselection. Select All button 1025 causes each of the checkboxes to be checked. In the example provided, five data elements are selected: BIRTH DATE, GENDER, CLAIM AMOUNT, RX DATE, and DRUG NAME as indicated by their checkboxes being checked.

At step 904, ambiguity resolution takes place as part of the data element selection. Selecting data elements may present a problem of name ambiguity. Thus, the user or system determines the specific data elements that should be included in the semantic search. Name ambiguity may occur in at least two ways. First, when a data model such as the Metamodel structures data in terms of units of meaning, the name attached to a unit of meaning (represented by a DEN), is arbitrary. Thus, a single DEN may have several different names attached to it. For example, referring back to Table 1, DEN 0012 has two names associated with it (SUBSCRIBER, PRIMARY ACCOUNT HOLDER). In these cases, both names will be displayed to the user, along with the description of the DEN ("A Social Security Number that identifies a health care plan subscriber that is the primary account holder"). This allows the user unfamiliar with all of the names attached to the DEN to be able to properly identify its meaning.

Second, because there is also no limitation on how many times a single name can be used in the system, several DENs may be associated with the same name, also resulting in name ambiguity. For example, two different DENs may have the name "CLAIM" associated with them. The first of these two DENs may have the meaning "A request for payment made by a member to a health plan company," while the second DEN may have the meaning "a sentence that defines the boundaries of an invention." In cases where a single name has more than a single data element associated with it, all data elements associated with the name (along with the description of the data elements) are displayed to the user so that he may select the data element (or data elements) that he wishes to include in the semantic search.

Once the ambiguity associated with data element names has been resolved, at step 905, data relation selection occurs. Data relation selection is designed to resolve context ambiguity by allowing the user to specify the context in which each of the selected data elements are searched. Context ambiguity occurs when selected data elements participate in more than one data relation within the selected search domain. Based on the selected data elements, the system goes through the data model and finds each data relation in which the selected data elements participate. For instance, in the example illustrated in FIG. 10, DEN 0022 participates in two relations within the selected data view: (1) in simplex relation IM in prescription view 706, and (2) in complex relation I<IM in claim view 712. Thus, DEN 0022 appears in two contexts. The user is presented with a user interface that displays each of the contexts and allows the user to limit the search to DEN 0022 as it pertains to prescription view 706 or as it pertains to claim view 712. In resolving these instances of context ambiguity, all participating data relations are displayed so that they may be further refined. Any combination of the data relations may be selected to further limit possible dependency paths. If no data relation is selected, the system may use both data relations in calculating a data path.

Next, at step 906, data perspective selection takes place (also called subject selection). Data perspective refers to the viewpoint from which the data returned by the semantic search engine will be observed. Or, put another way, data perspective correlates to the starting point (or context) for assembling the desired data. Data perspective is a matter of construal of the particular point of view from which the user understands the selected data elements. Selecting a data perspective establishes the context within which the selected data elements will be understood or interpreted.

The Metamodel is useful for determining which data elements may serve as the conceptual reference points (i.e., the data perspectives) for calculating a data dependency path according to one or more aspects of the invention. The set of potential data perspectives includes each of the identifiers contained in the specified search domain. Thus, any identifier (I) that is directly related to any of the selected data elements is a potential data perspective. Once selected, the data perspective becomes the primary data element around which all selected data elements are connected. As a result, the data perspective is the conceptual starting point of the calculated data dependency path. Different data perspectives result in different data dependency paths, and thus will often result in different data being returned to the user because changing the data perspective alters the order of the data search by changing the head of the data dependency path. Because there may be more than one way that the data elements may be tied together for a given perspective, a single data perspective may have more than one possible data dependency path.

The notion of data perspective may be thought of as being similar to the use in natural language of a subject in a sentence. This goes back to the idea that the data is semantically modeled, connected by meaning rather than by notation. Thus, if the returned data is thought of as a sentence, the data perspective may be considered the subject of that sentence. Selecting a data perspective allows the user to make mental contact with the data. This mental contact is related to the notion of construal which refers to the ability of the human brain/mind to portray an observed situation in various ways. Using data perspective as a starting point for calculating data dependency paths furthers the purpose of using a semantic data model—modeling and displaying data in a way more closely related to how the human brain/mind views the world around it.

A particular data perspective (or subject) may be selected based on its semantic prominence by way of some sort of ranking system. In one or more embodiments, this ranking may be determined using a ranking system based on the how closely the selected data elements relate and cluster around each potential data perspective. The selected data perspective need not be one of the selected data elements. For example, if the user wants to compile anonymous statistical medical data based on Members, but he wishes not to identify the members individually, he would select a set of data elements (in step 903) that does not include DEN 0001 (Member). Nevertheless, DEN 0001 may still be used as a data perspective as long as the selected data elements can be tied semantically to DEN 0001. Or, stated differently, as long as one of the selected data elements participates in a data relation that includes DEN 0001, DEN 0001 may be used as a the selected data perspective, even though it was not selected as a data element in step 903. A user may also decide not to select a data perspective. In these instances, the system may automatically default to a data perspective deemed the most semantically relevant or prominent.

In one or more aspects of the invention, the ranking system may be based on how many of the selected data elements appear in each potential perspective. Referring back to the example shown in FIG. 10, there are five data elements (DENs 0019, 0006, 0018, 0022, and 0015) selected from the composite data view (Member View 702, Prescription View 706, claim View 712). Each of the Identifiers (I's) in the data view is a potential data perspective. Thus, the DENs 0014:RX, 0021:CLAIM and 0001:MEMBER are potential data perspectives (or subjects). The system determines how many of the selected data elements participate in a data relation with each potential data perspective. The potential data perspective directly related to the highest number of data elements is considered the most semantically relevant.

Figure 11:
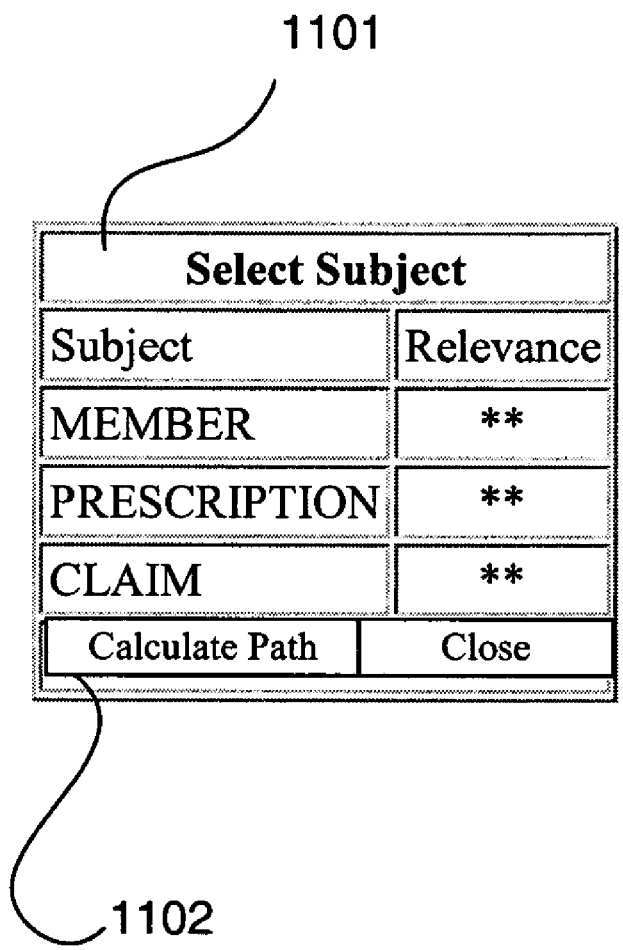
FIG. 11 illustrates a user interface in which a user selects a data perspective according to one or more aspects of the invention.

Referring now to FIG. 11, an example of a data perspective selection menu 1100 is provided based on the selected domain and selected data elements from FIG. 10. The menu includes ranking list 1101 and action buttons 1102. The system has ranked each of the potential data perspectives in ranking list 1101. Member View 702, Prescription View 706, and claim View 712, each have been assigned a relevance ranking of two asterisks. Rankings may be determined in the following manner: First, the system determined how many of the selected data elements participate in a relation with DEN:0001:MEMBER (i.e., how many of the selected data elements participate in Member View 702). Two of the selected data elements (BIRTHDATE and GENDER) participate in a data relation in Member View 702. Thus, the relevance ranking from the Member perspective is two asterisks. Two of the selected data elements (RX DATE and DRUG NAME) participate in a data relation in Prescription View 706. Thus, the relevance ranking from the Prescription perspective is also two asterisks. Finally, two of the selected data elements (RX DATE and CLAIM AMOUNT) participate in a data relation in claim View 712. Thus, the relevance ranking from the prescription perspective is also two asterisks. In this given example, the relevance rankings are equal. If an additional selected data element were added, for example DEN 0009:MEMBER NAME, the rankings would change. Member View 702 would receive an additional asterisk and be ranked the most relevant with three asterisks. The remaining two potential data perspectives would stay at two asterisks.

Once the user has selected a perspective, he may click on Calculate Data Path button 1102, which causes the system to proceed to step 907. At step 907, one or more data dependency paths are calculated by the system based on the selections made in the previous steps. A data dependency path according to aspects of the present invention is a semantic construct, similar to a memory trace within the brain/mind. In some embodiments, the data dependency path may be presented to the user as an indented hierarchy of data elements reflecting the dependency of the data elements participating in a data search.

Figure 12:
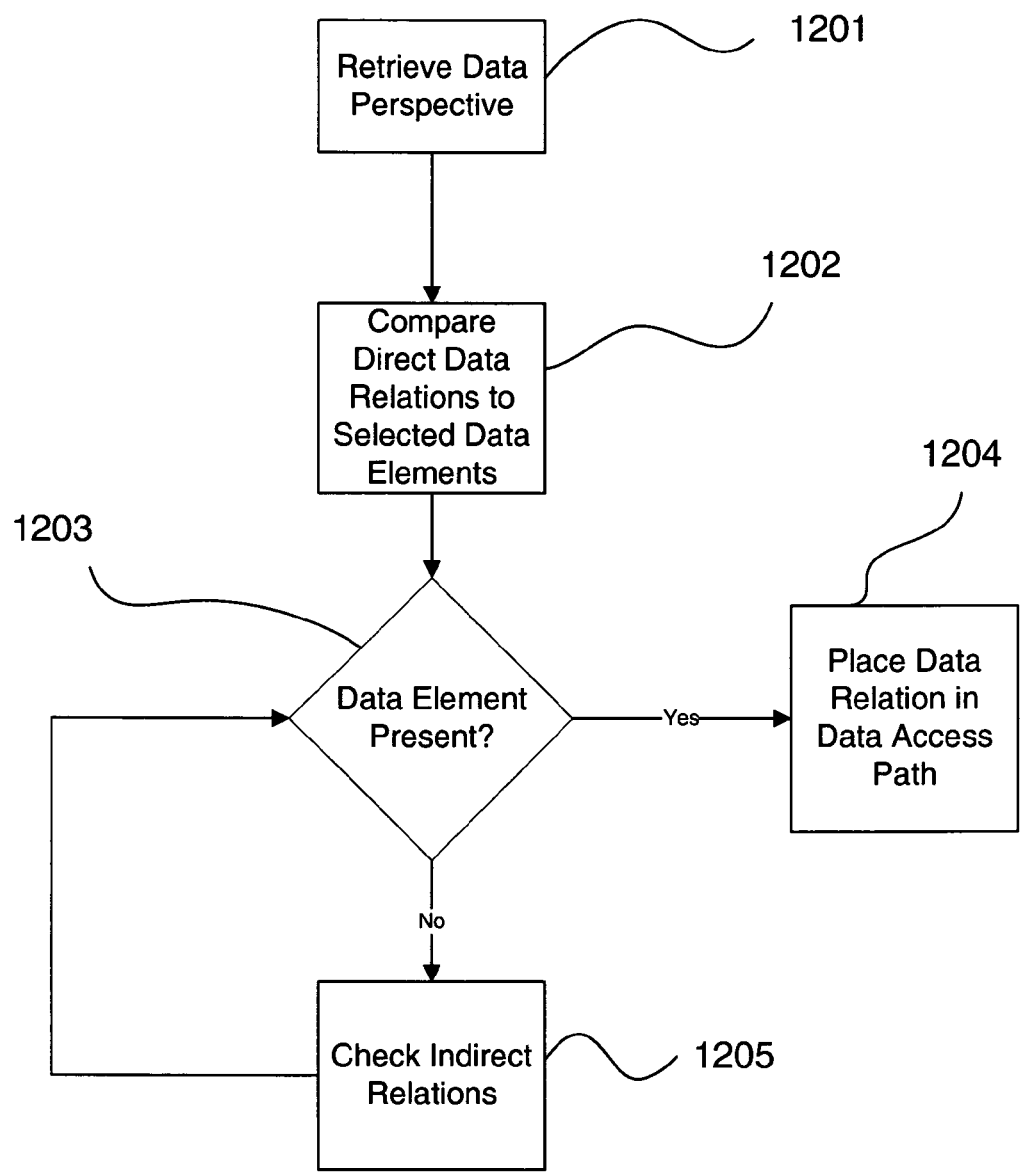
FIG. 12 illustrates a flow diagram that describes the steps for creating a data dependency path according to one or more aspects of the invention.

Referring to FIG. 12, a flow chart depicting a method for calculating a data dependency path is illustrated. At step 1201, the initial Identifier representing the data perspective (determined in step 906) is retrieved. At step 1202, each of the data relations directly related (i.e., all of the relations in the same view) to the initial Identifier is checked to see if any of the selected data elements (from steps 903 and 904) are included in these data relations. If so, the data relations are incorporated into the data dependency path. At 1203, the system determines whether any of the data relations directly related to the initial Identifier connect to any data relations that the remaining selected data elements participate in. If so, then these relations are added to the data path at 1204. If after step 1203, selected data elements remain that have not yet been placed in the data path, the system, at step 1205 scans the data relations connected to the data relations directly related to the initial Identifier. If any of the selected data elements participate in these data relations, they are added to the data path at 1204. This process continues until each selected data element is placed in the data path. The data dependency path that is calculated may include data elements that were not selected as data elements in step 903. This inclusion of non-selected data elements will generally occur in instances where indirect data relations are used to access data.

To summarize, the system first determines if there is a direct relationship between the data perspective and each selected data element. For those selected data elements not directly related to the data perspective, the system looks for the closest indirect relationship (A relates to B relates to C) by looking at data relations connected to the initial set of relations. Ultimately, if no connection is found between the data perspective identifier and any of the selected data elements, no solution is available. Where a connection is found, however, several different data paths may be calculated for a single data perspective due to the semantic nature of the data model. There may be several different ways of connecting the selected data elements to the data perspective and each of these ways will produce different data dependency path.

Figure 13:
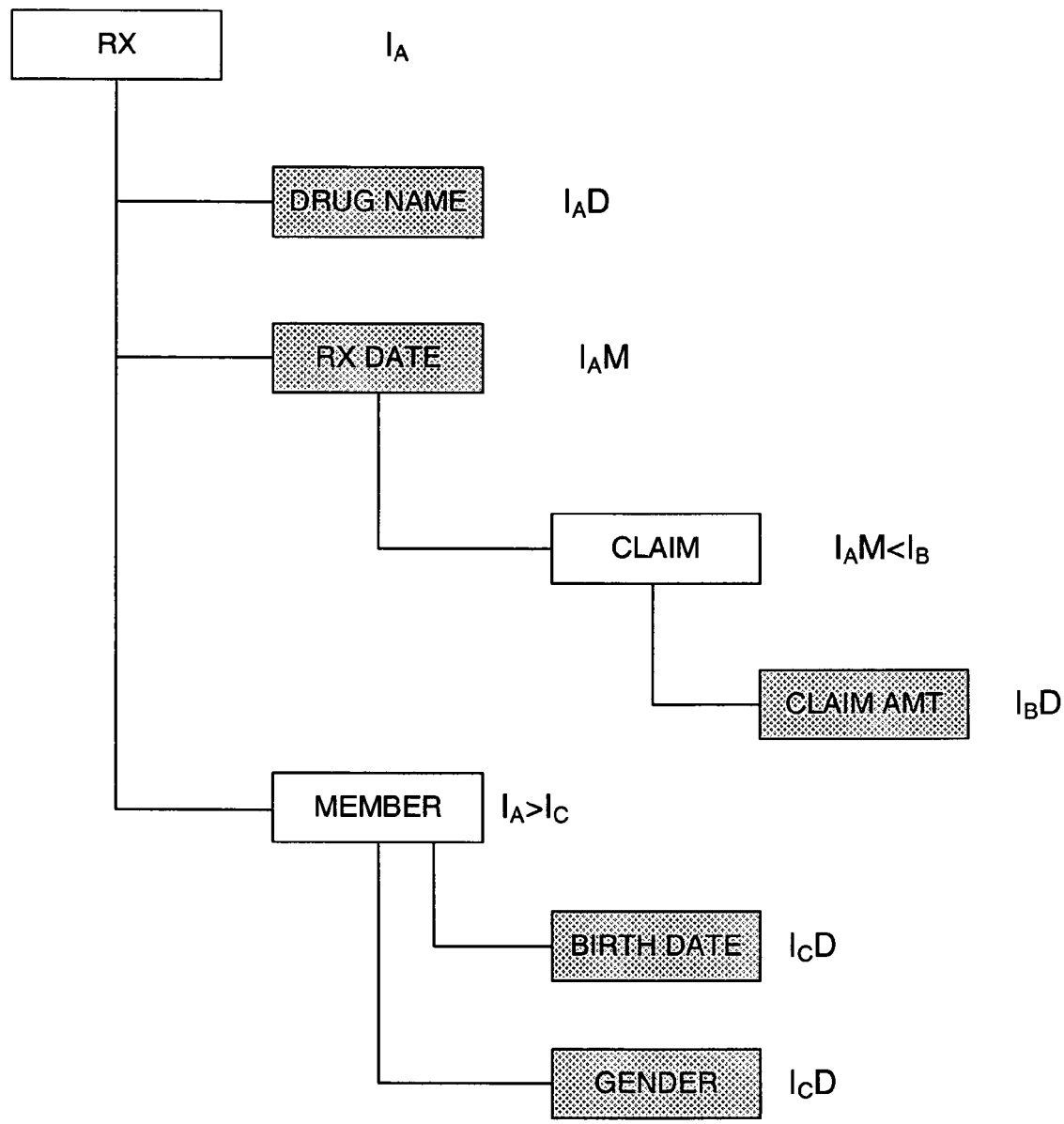
FIG. 13 illustrates a data dependency path from a first perspective according to aspects of the invention.

Referring now to FIGS. 13–16, various data dependency paths for the data elements selected in step 903 are shown that would be calculated by implementing the steps described in connection with FIG. 12 above. The data dependency paths show, in indented format, how the selected data elements logically and/or semantically relate to each other. Showing these logical and/or semantic relationships provides a roadmap for how the data should be logically accessed from physical storage. FIG. 13 provides an illustration of a data dependency path that may be created with Prescription as the subject (i.e. data perspective) of the semantic search. Using the subject as the starting point, the top of the data dependency path is a single Identifier $I_A$ RX ($I_A$ refers to a first identifier, $I_B$ refers to a second, and $I_C$ refers to a third, distinct identifier in that given data relation). The system then looks in Prescription View 706 to determine whether any of the selected data elements were in the view. DRUG NAME $I_A$D and RX DATE $I_A$M are in the view, and are thus added to the data path. Next, the system looks at the data relation $I_A>I_C$ MEMBER and sees that both BIRTH DATE and GENDER participate in a simplex ($I_C$D) data relation with MEMBER. As a result, MEMBER is added to the data dependency path as a connector for BIRTHDATE and GENDER. Next, the system sees that RX DATE participates in a complex data relation with CLAIM defined as $I_A M<I_B$. Next, the system scans the data relations participated in by $I_B$, (CLAIM) and finds CLAIM AMOUNT $I_B$D. As a result each of these data relations is added to the data dependency path. Each of the five selected data elements in the example have been added, completing the data dependency path from the perspective of Prescription View 706.

Figure 14:
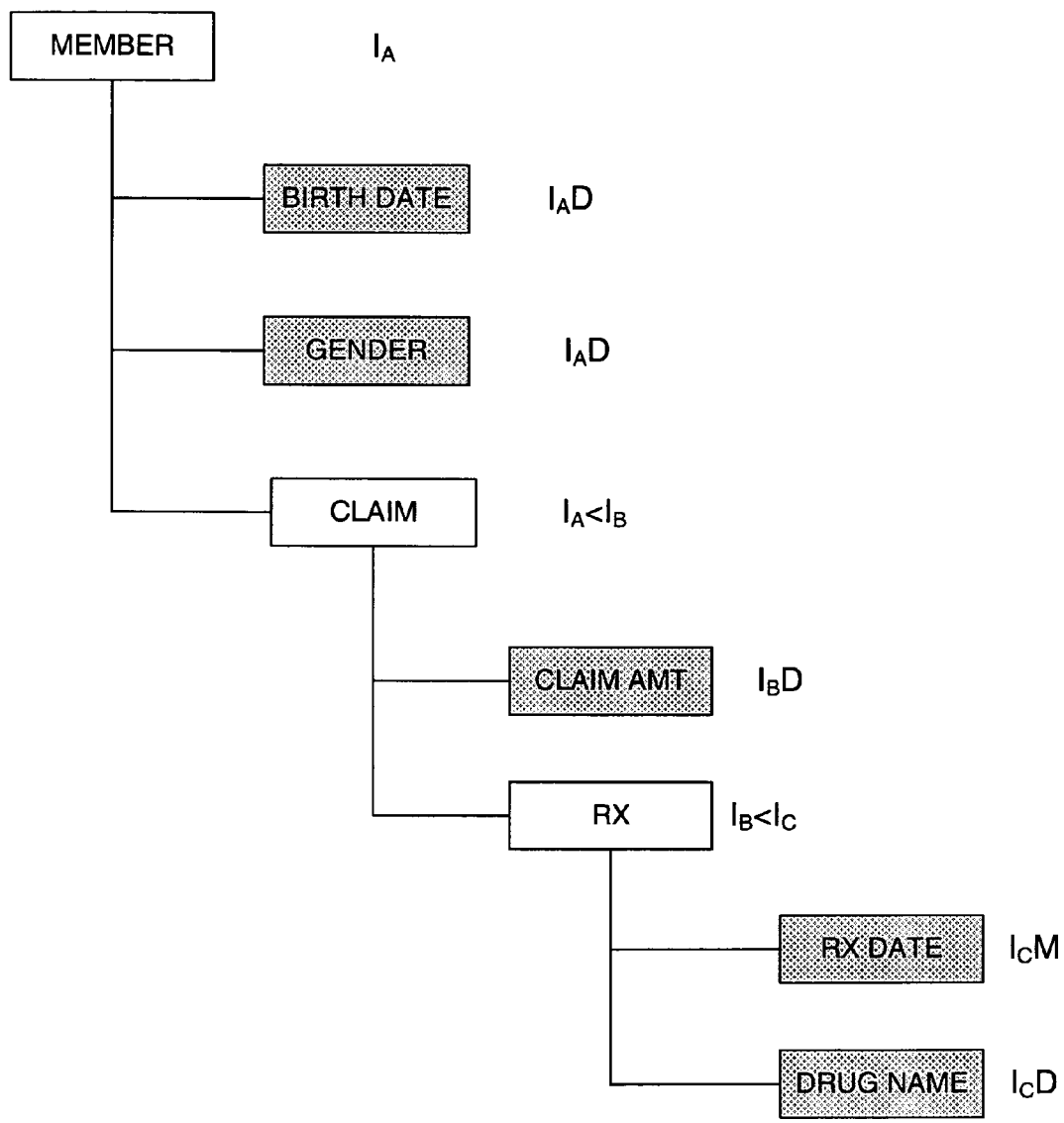
FIG. 14 illustrates a data dependency path from a second perspective according to aspects of the invention.

Referring now to FIG. 14, an example of a data dependency path from the Member perspective is shown. Using the subject Member ($I_A$) as the starting point, the system traverses the data relations in the Member View 702. It finds BIRTH DATE ($I_A$D) and GENDER ($I_A$D) and adds them to the data dependency path. Next, it looks at the data relation with CLAIM defined as $I_A<I_B$. Scanning the data relations participated in by $I_B$, (CLAIM), the system finds CLAIM AMOUNT ($I_B$D) and adds it to the data path along with CLAIM. Next, the system finds a data relation between CLAIM and RX ($I_B<I_C$). Scanning the data relations participated in by $I_C$ (RX), the system finds RX DATE ($I_C$M) and DRUG NAME ($I_C$D). As a result, these data relations are added to the data dependency path as well.

Figure 15:
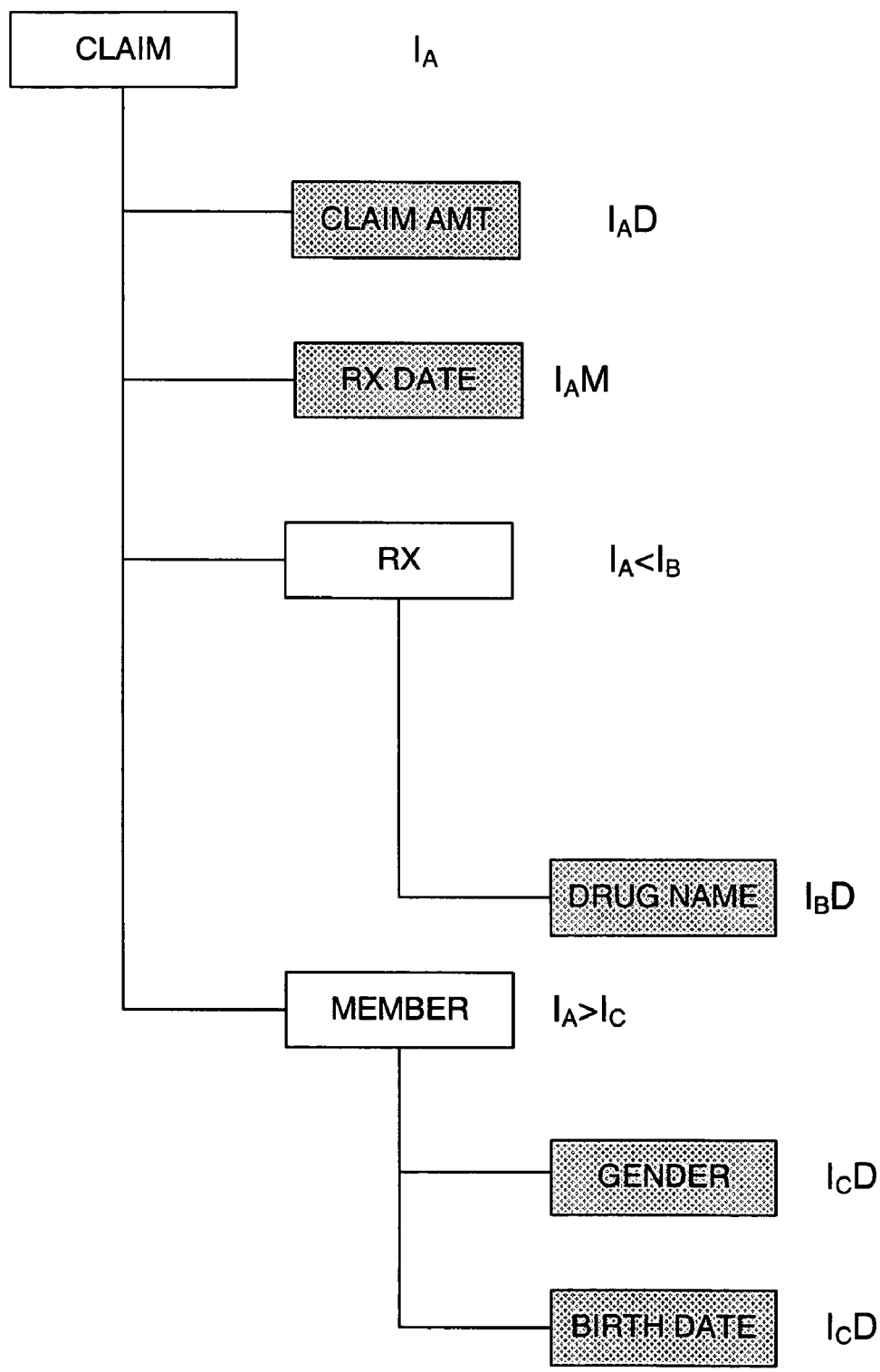
FIG. 15 illustrates a data dependency path from a third perspective according to aspects of the invention.

Referring now to FIG. 15, an example of a data dependency path from the claim perspective is provided. Using the subject claim ($I_A$) as the starting point, the system proceeds through the data relations in claim View 712. It finds CLAIM AMOUNT ($I_A$D) and RX DATE ($I_A$M) and adds them to the data path. The system further scans claim View 712 and finds a complex data relation $I_A>I_C$ with MEMBER. The system then scans Member View 702 and finds both GENDER ($I_C$D) and BIRTH DATE ($I_C$D) and adds them to the path. Finally, the system finds a complex data relation between CLAIM and RX ($I_A<I_B$). Scanning the data relations that RX ($I_B$) participates in, DRUG NAME ($I_B$D) is found and added to the data path.

Figure 16:
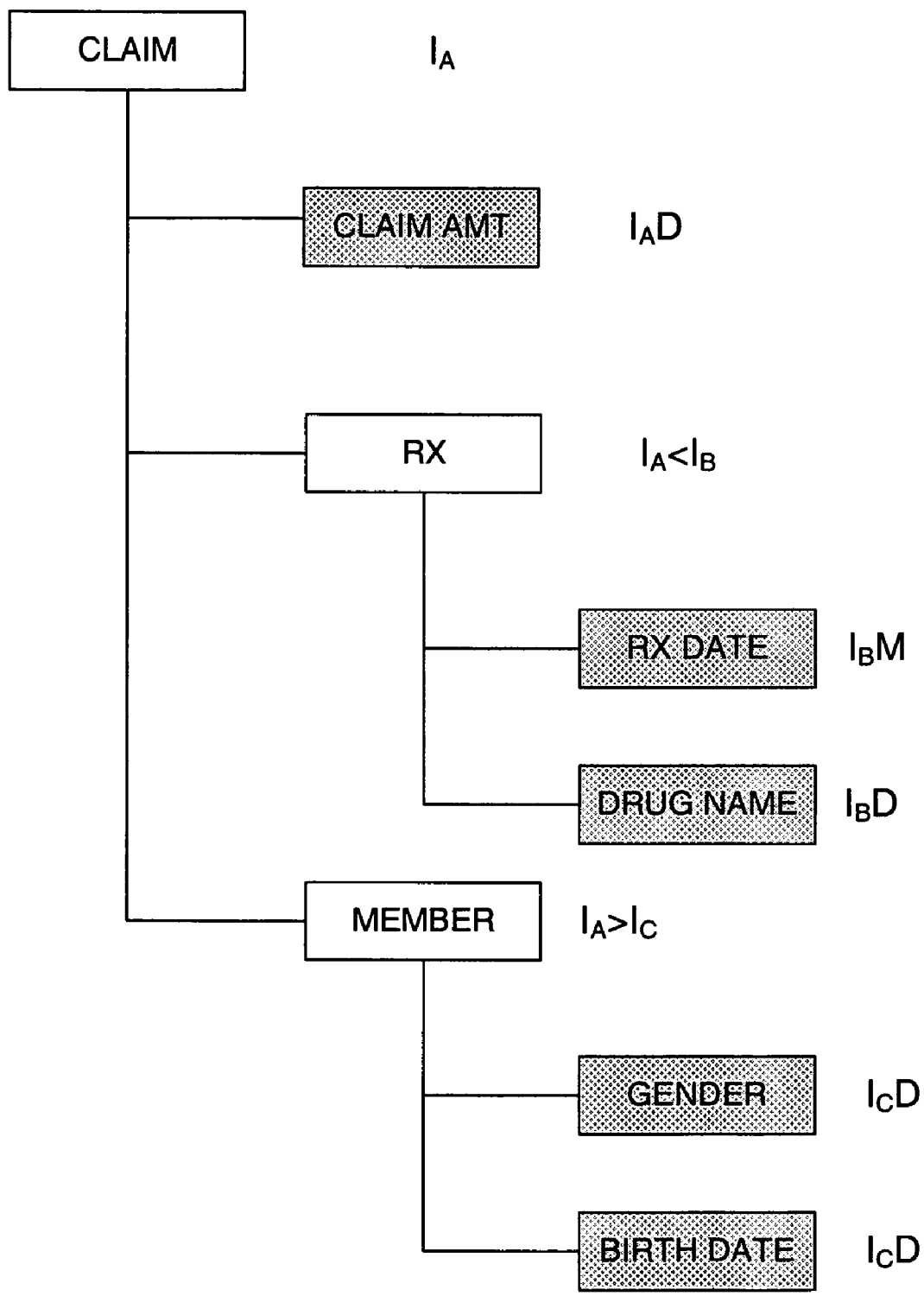
FIG. 16 illustrates a second data access from the third perspective according to aspects of the invention.

As noted above, a single data perspective may produce multiple data dependency paths. FIG. 16 illustrates an example of an alternate data dependency path that may be created using the same subject as FIG. 15 (claim) as the starting point. Once again using the subject claim as the starting point, the system scans the data relations in claim View 712. It finds CLAIM AMOUNT ($I_A$D) and adds it to the data dependency path. Next it finds data relation RX ($I_A<I_B$). Scanning the data relations in the data domain that RX ($I_B$) participates in, the system finds simplex relations RX DATE ($I_B$M) and DRUG NAME ($I_B$D) and adds them to the data dependency path along with RX ($I_A<I_B$). Next the system finds a complex relation between CLAIM and MEMBER ($I_A>I_C$). The system then scans Member View 702 and finds simplex data relations GENDER ($I_C$D) and BIRTH DATE ($I_C$D) and add them to the data dependency path along with MEMBER ($I_A>I_C$).

Each of the calculated data dependency paths may return different data or, in some cases, the same data. In other words, in some instances different data dependency paths will retrieve the same data, while in other instances the different data dependency paths will retrieve different data.

Figure 17:
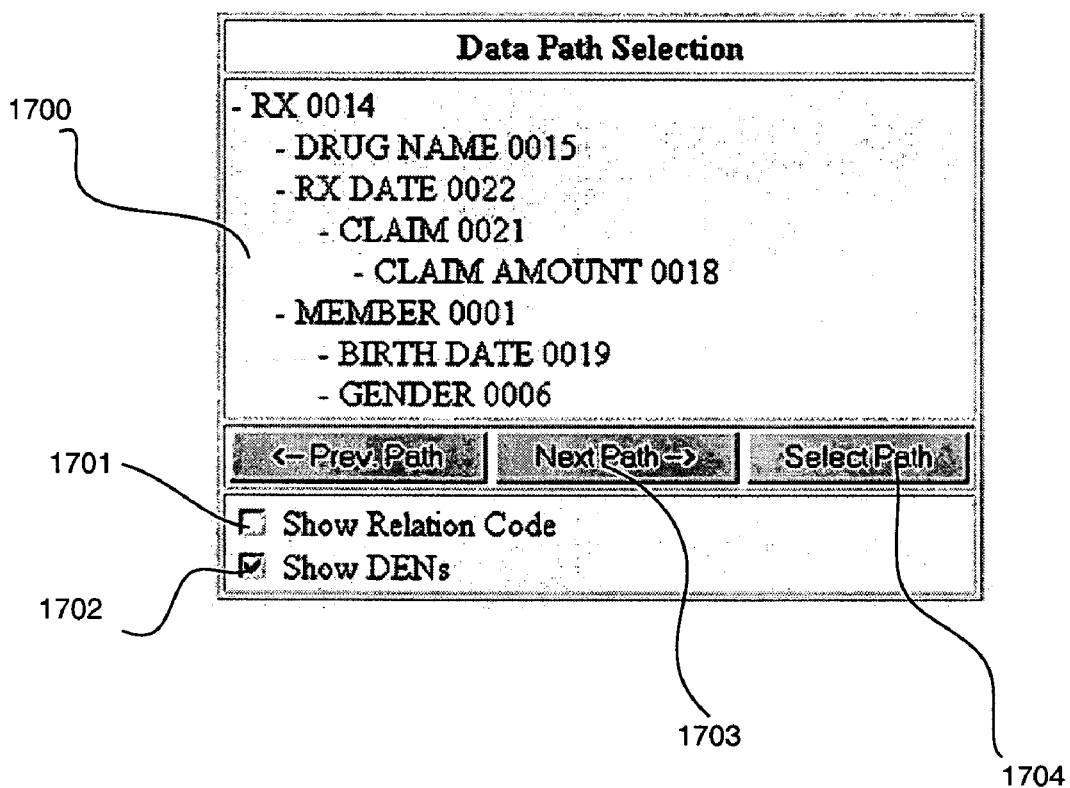
FIG. 17 illustrates a user interface by which a user can select an available data dependency path according to one or more aspects of the invention.

Referring now to FIG. 17, an example of a data dependency path selection interface is provided that shows the data dependency path of FIG. 13. The data dependency path selection interface provides the user the ability to select from a number of calculated data dependency paths the one that best fits his or her needs. The interface includes a data path display area 1700 which displays the calculated data dependency paths. The path includes the name of the data elements, and optionally their relation code (i.e. one of the 28 data relations in the Metamodel) and DEN. The display of the relation code and DEN is enabled by activating the corresponding checkboxes 1701 and 1702. Data dependency path selection interface may also include toggle buttons 1703 which allow the user to scroll or move through each available calculated data dependency path. As noted previously, the data dependency path will be displayed in an indented format with the selected data perspective being at the top level. After the user has moved through the available data dependency paths and found the data dependency path that they wish to use to retrieve data, they may click on select button 1704 which will indicate to the system that the selected data dependency path will be used to ultimately retrieve the data.

Once available data dependency paths have been calculated, another aspect of the invention provides a method for defining database security. According to the method, a security code may be placed on a data element, a data relation, or on the data dependency path itself which determines who can access the data relation. Defining security on each data relation allows for significantly more granularity in determining which users have access to which data. At least three permission types (restriction levels) are available for each data relation: (1) the user can access the data relation (i.e., full access), (2) the user can use it as a pass through to retrieve other data (i.e., pass-through access), and (3) no access whatsoever (i.e., the user can't even know that the data exists).

Thus, once the available data dependency paths have been determined by the system using the steps described above in FIG. 9, any path that requires data from a data relation with a type-3 restriction level will not be presented to the user because the user is not entitled to know of the existence of that piece of data. Thus, if the user requests a body of semantically related data for which the only available data dependency paths include a data relation with a type-3 restriction level, the system will return a null result, indicating that no such data exists within the system.

In contrast, any path that includes only type-1 and type-2 restricted data relations will be presented to the user for selection. If any of the requested data elements are type-2 restricted data relations, their existence may be displayed to the user, but the field will be empty. The use of the type-2 restricted data permission type will be especially beneficial where certain data must be restricted, but that data is necessary to reach other data that is not restricted. For example, in the Metamodel 700 of FIG. 7, a government researcher may wish to compile statistical health data. However, due to privacy laws, the researcher might not have access to personal identifying data such as DEN 0001 MEMBER, DEN 0009 MEMBER NAME, etc. However, much of the useful data that can be extracted from Metamodel 700 requires that the calculated data path pass through the MEMBER data relation.

Referring back to the example data dependency paths provided in FIGS. 13–16, a user has requested DRUG NAME, RX DATE, CLAIM AMOUNT, BIRTH DATE, and GENDER. Each of the calculated data dependency paths in FIGS. 13–16 passes through MEMBER. Thus, if MEMBER were a type-3 restricted data relation, none of these data dependency paths would be displayed to the user. However, if MEMBER is designated a type-2 restricted data relation, the data dependency paths would be displayed because the user is allowed to use MEMBER as a pass-through to other data. Thus, utilizing the second permission type, a user may be permitted to create data views based on secured data without having full access to the secured data.

Another aspect of the invention provides for alert profiling. Alert profiling allows a user to define certain conditions that when met, cause an alert to be generated. These conditions are always defined within a dependency path. By defining the conditions within a data dependency path, data items which appear on their face to be unrelated, or distantly related, can be usefully mined for relevant information. After a data dependency path has been created and selected by the user, the user may then provide the system with a set of parameters within that data dependency path. If data matching the parameters enters the system, a notification is sent to the user to some other party designated by the user.

Another aspect of the invention provides for the implementation of a database based on a semantic data model (such as the Metamodel) in a relational database management system (RDBMS). Examples of RDBMS's include but are not limited to Oracle®, MS SQL Server, Sybase, DB2, and MySQL. A benefit of this type of implementation stems from the fact that many RDBMS products are commercially mature and have many peripheral software products designed to work with them. Thus, the access methods, backup methods, and other features of these software packages are made available to semantic data models. For example, many commercial RDMBS packages such as Oracle® have backup software specially designed to work with the database. A Metamodel implemented on Oracle® can utilize backup software designed for Oracle®. As a result, the designer of the Metamodel need not develop separate software for backup. In addition, many of the database engines running these packages are specially tuned for performance with large bodies of data. Providing a mature database engine allows database designers to spend more time focusing on simplified design within the semantic data model, and then later implementing the design in a performance-rich RDBMS.

A semantic data model like the Metamodel may be implemented in relational form using a single table to store all of the data. Each row in the table represents a set of data for a relation. Even though each row is commonly defined, there could be 28 different ways for filling in the row. Unlike a flat file where a new field must be added to account for each additional unit of meaning, the single table defined by the Metamodel may have a fixed number of fields as shown in FIG. 18, which illustrates how a relational table of the Metamodel from FIG. 7 may be designed. The relation table 1800 includes field names 1801 which are listed across the top row of table 1800.

Reading the fields across, it becomes apparent that the fields are structured to reflect the 28 data relations (IM*IMD) of the Metamodel. The first field is I1_DEN, which stores the DEN of the first identifier in the data relation. The next field is I1_VAL which stores the value associated with that instance of the DEN. The next field is M1_DEN which stores the DEN of the first modifier in the data relation. M1_VAL, like I1_VAL stores the value associated with the instances of the DEN stored in that row. The fields described to till now reflect the IM side of the IM*IMD data relation. The remaining fields are associated with the IMD side of the data relation.

The next field stores the DEN for the second identifier in the data relation and is called I2_DEN. I2_VAL stores the value associated with that instance of the I2_DEN. Next, the M2_DEN stores the DEN for the second modifier in the data relation, and M2_VAL stores the value associated with that instance of the M2_DEN. Finally, a field D_DEN stores the DEN for a descriptor. Because there is only a single descriptor in the IM*IMD data relations of the Metamodel, only a single D_DEN field is necessary in the table. Next, the D_VAL field stores the value associated with the instance of D_DEN. Finally, the field RC, which stores the combined relationship code, is placed in the table. In addition, because the DEN is included in each record, there is no need to keep a data catalog as is the norm in relational database modeling.

The remaining rows of data in FIG. 18 comprise data relations with sample data that would result from the Metamodel defined in FIG. 7. The first row, has I1_DEN of 0001 (which stands for MEMBER) and an I1_VAL of '123-45-6789-10'. The relation code (RC) is set to 1 which indicates that the data relation is the simplex data relation I. Referring back to FIG. 5, each of the possible 28 data relations are numbered. It is this number that is reflected in the RC field. Thus, the meaning represented by the first row in the table is "A member whose value is 123-45-6789-10. The next row also contains I1_DEN of 0001, I1_VAL of '123-45-6789-10'. It further contains D_DEN of 0009, D_VAL of 'John Doe' and RC of 2 representing the simplex relation ID (see FIG. 5). Thus, the meaning represented by this second row in the table is 'A member with a value of 123-45-6789-10 has a name John Doe'. Each of the remaining rows may be read in a similar fashion.

In yet another aspect of the invention, a method for rapidly creating a user determined input/output interface is provided. Upon calculating a data dependency path for user-selected data items using the techniques provided above, a data entry/retrieval interface may be created by a non-technical user. Once the available data dependency paths have been calculated, the user selects one of the data dependency paths. After selecting the path, a window with the selected data items is presented to the user. A second window may serve as the palette for creating the interface. The user may drag and drop each item onto the palette in order to create a data entry/retrieval screen. When each item is dragged and dropped onto the palette, a data entry field is created. The user then has the option to rename the field to a more preferred term. This option is made possible by the semantic nature of the data—i.e., that fact that data is structured in terms of units of meaning rather than in notational terms.

After each selected data item has been placed on the palette, the interface is complete and the user may then enter and retrieve data using the rapidly developed interface. When the user enters a value in a field that already exists in the database, that record is retrieved and displayed to the user and the user can modify the values in the database. If the user enters values that are not already present in the database, the system adds the values to the database. Thus, the calculation of data dependency paths according to the present invention provides a basis upon which data may not only be easily accessed, but also a way for data to be more easily modified and added to a system.

Figure 19:
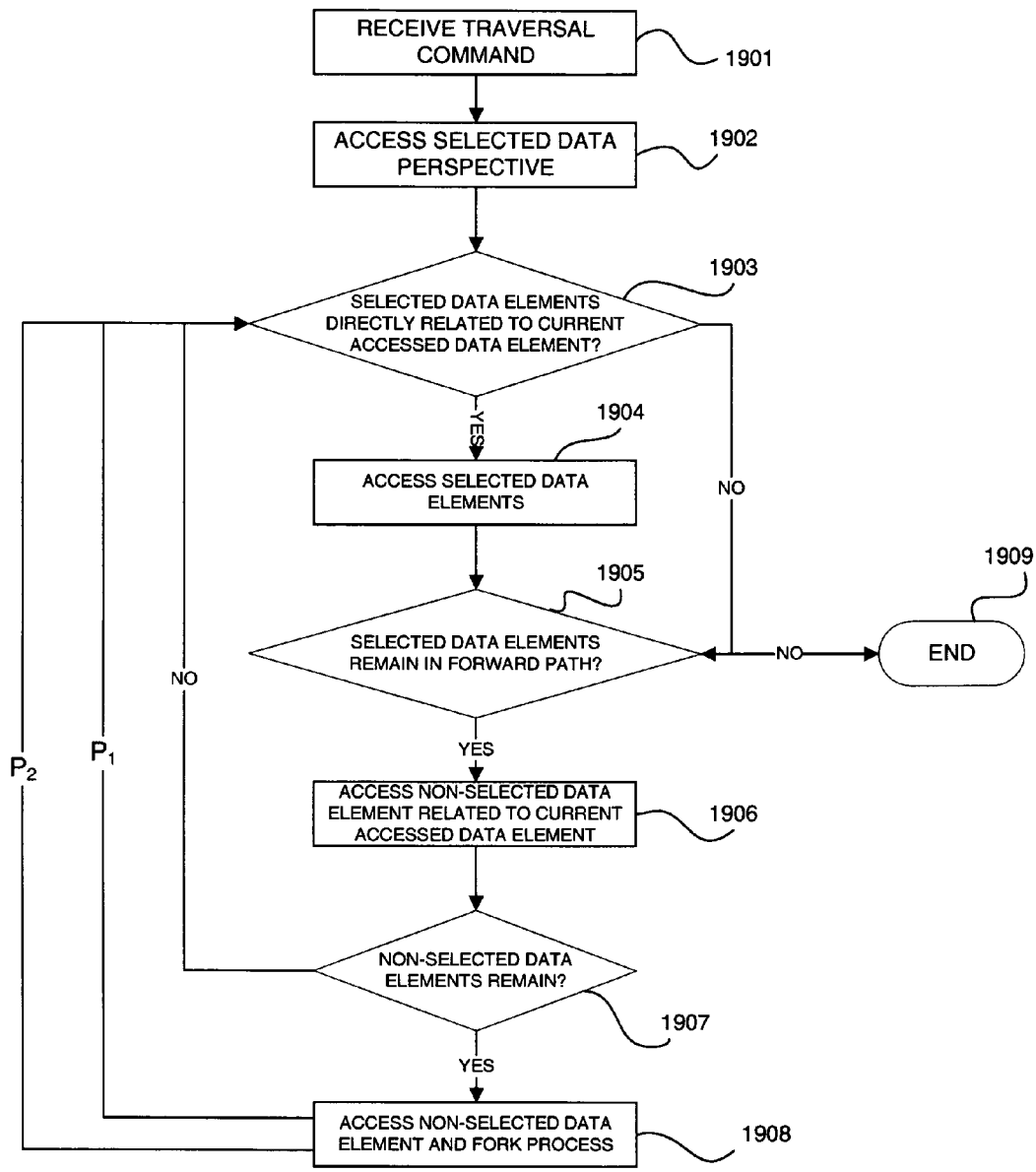
FIG. 19 illustrates a method for traversing a data dependency path utilizing parallel processing according to aspects of the invention.

In another aspect of the invention, a method of implementing parallel processing to create or traverse a data dependency path is provided. With reference to FIG. 19 the method is described with respect to the data dependency path defined in FIG. 15. As discussed previously, the data dependency path of FIG. 15 was created from a request for five data elements (CLAIM AMOUNT, RX DATE, DRUG NAME, GENDER, BIRTH DATE). At 1901, a data access program receives a command instructing it to traverse the data dependency path of FIG. 15. At 1902, the system first accesses the selected data perspective. In FIG. 15, the selected data perspective is CLAIM ($I_A$) which becomes the current accessed data element. (The subscripts such as "$I_A$" used hereinafter are for the purpose of distinguishing between different Identifiers that are being referenced.) At 1903, the system asks whether any of selected data elements are directly related to the current accessed data element. If so, the system proceeds to 1904. If not, the system skips forward to 1905.

At 1904, the system accesses those data elements that are selected data elements (i.e. the data elements that were requested by the user). In the case of FIG. 15, CLAIM AMT ($I_A$D) and RX DATE ($I_A$M) each are selected data elements directly related to CLAIM ($I_A$). Next, at 1905, the system determines whether selected data elements remain in the forward data dependency path that have not yet been accessed. In the example provided by FIG. 15, only two of the five selected data elements have been accessed, and thus, selected data elements remain (DRUG NAME ($I_B$D), GENDER ($I_C$D) and BIRTH DATE ($I_C$D). If no selected data elements remain, the traversal ends at 1909. However, in the example of FIG. 15, the system proceeds to 1906 where it accesses the first available non-selected data element. As discussed above, a non-selected data element is a data element that is placed in the data dependency path in order to provide a bridge (or link) from the selected data perspective to the selected data relation. For example, in order to get from selected data perspective CLAIM to selected data element DRUG NAME in FIG. 15, the path must go through non-selected data element RX. Accordingly, at 1906 the system accesses RX ($I_A$<$I_B$).

At 1907, the system asks whether any non-selected data elements remain in the data dependency path. If not, the system returns to 1903 where it repeats the process of determining whether data elements directly related to the current accessed data element are selected data elements. If non-selected data elements remain in the data dependency path, the system proceeds to 1908, where it forks the process and accesses the non-selected data element with the newly created process. In the example of FIG. 15, the non-selected data element MEMBER ($I_A$>$I_C$) remains. Thus, the process forks and MEMBER is accessed by the newly created process. Thus, two processes exist, with the first process (now referred to as $P_1$) accessing RX, and the second process (now referred to as $P_2$) accessing MEMBER. Each process separately returns to 1903. These processes now operate concurrently. Due to the fact that each process will only drill down further into the data dependency path, there is no chance that the processes will interfere with each other by accessing the same data at the same time.

When $P_1$ returns to 1903, its currently accessed data element is RX ($I_A$<$I_B$). Thus, the system will determine whether selected data elements are directly related to RX. The selected data element DRUG NAME ($I_B$D) is directly related to RX, so the system proceeds to 1904, where it accesses DRUG NAME ($I_B$D). Next at 1905, the system looks at the forward data path to see if selected data elements remain. Because DRUG NAME is a termination point of the data dependency path from RX, no selected data elements remain and the process $P_1$ ends at 1909.

When $P_2$ returns to 1903, its currently accessed data element is MEMBER ($I_A$>$I_C$). Thus, at 1903 the system will determine whether selected data elements are directly related to MEMBER. The selected data elements GENDER ($I_C$D) and BIRTH DATE ($I_C$D) are each directly related to MEMBER. The system proceeds to 1904 where it accesses each of these selected data elements. Next, the system examines the forward data path at 1905 to determine whether selected data elements remain to be accessed. Each of GENDER and BIRTH DATE are termination points of the data dependency path from MEMBER. Thus, no selected data elements remain to be accessed and process $P_2$ terminates at 1909. Using the parallel processing method described above, the system can more efficiently traverse through complex data paths to retrieve desired data. The parallel process method may also be used to create a data dependency path in a similar manner.

In yet another aspect of the invention, a method is provided for automatically creating other data structures based on a calculated data dependency path. Using this method, a data dependency path is created and converted into an alternative data structure such as a relational data base table or an XML file.

Figure 20:
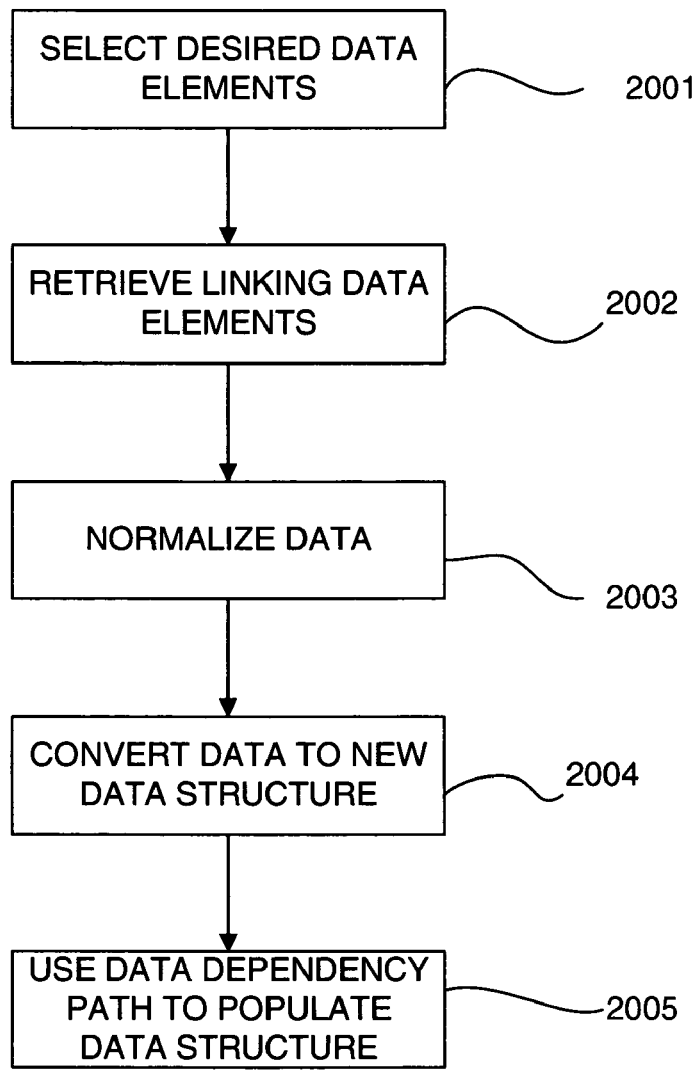
FIG. 20 illustrates a method for creating an alternative data structure from a data dependency path according to aspects of the invention.

Referring to FIG. 20, at 2001, data elements having desired data are selected. This selection may be done using the techniques described above with reference to FIG. 9. Once the desired data elements have been selected, at 2002 the system also retrieves each of the data elements necessary to link the selected data elements. These additional data elements may be retrieved by creating a data dependency path, also according to the steps provided in FIG. 9. The data dependency path will include each of the necessary data elements for relating the selected data elements.

At 2003, the system takes both the selected data elements and the retrieved additional (linking) elements and applies rules of normalization to convert the data into normal form. Once the data has been normalized, at 2004 it is converted to one of several different data forms well-known in the art such as a relational database table or an XML definition. At this point, the record structure has been created. At 2005, the system then uses the data dependency path that was created to retrieve data from the Metamodel and populate the new data structure with the retrieved data.

Utilizing the present invention, subject matter experts without any knowledge of how the data is logically or physically structured are able to quickly create ad hoc queries of a body of semantically related data. Users can easily design an interface based on the ad hoc queries, and retrieve, add and modify data through the interface. Security permissions may be defined to allow restricted data elements to be used as pass-through data elements for accessing data without giving access to the restricted data elements themselves.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computer-assisted method for automatically calculating a data dependency path defining logically connected data usable to identify queried data, comprising steps of:

analyzing a data model stored in one or more computer readable media to identify a data view of the data model, said data model comprising a propositional structure representing a grammar having a plurality of parts of speech, said propositional structure having 28 predefined data relations comprising identifiers, modifiers, and descriptors related using predefined logical operators;

automatically creating the data dependency path based on the identified data view; and a storing data identifying the data dependency path.

2. The method of claim 1, wherein the creating step further comprises selecting data elements from the identified data view of the data model.

3. The method of claim 2, wherein the creating step further comprises selecting a data perspective as a starting point for the data dependency path.

4. The method of claim 3, wherein the data perspective is selected from one of a plurality of data perspectives.

5. The method of claim 4, wherein each of the plurality of data perspectives is ranked according to semantic prominence.

6. The method of claim 5, wherein the semantic prominence is calculated by performing steps comprising:

selecting a potential data perspective;

determining how many selected data elements are directly related to the potential data perspective; and ranking the potential data perspectives according to the number of directly related data elements.

7. The method of claim 6 wherein the steps for calculating semantic prominence are performed for each potential data perspective.

8. The method of claim 2, further comprising if two of the data elements from the data model have a similar name, displaying each similarly named data element and a description of each similarly named element prior to selecting data elements.

9. The method of claim 8, further comprising receiving a selection of one of the similarly named elements.

10. The method of claim 2, wherein the selected data elements comprise a set of data elements about which the calculated data dependency path will return data.

11. The method of claim 1, wherein the data view comprises data located in a plurality of databases.

12. The method of claim 11, wherein the data view comprises of a set of data elements.

13. The method of claim 12, wherein the data view further comprises data relations in which the set of data elements participate.

14. The method of claim 1, wherein the data dependency path is limited to the selected data view.

15. The method of claim 1, wherein the creating step further comprises selecting one or more data relations in order to resolve a context ambiguity.

16. The method of claim 15, wherein the selecting of the set of data relations limits possible calculated data dependency paths.

17. The method of claim 1, wherein the creating step further comprises:

retrieving a data perspective indicative of the starting point of the data dependency path;

inspecting the data elements directly related to the data perspective;

if any of the data elements directly related to the data perspective is a selected data element adding the directly related data element to the data dependency path.

18. The method of claim 1, further comprising:

prior to creating the data dependency path:

defining a restricted permission type wherein data is restricted from a user; and applying the restricted permission type to a first data element;

wherein the created data dependency path uses the first data element as a pass-through.

19. The method of claim 18, wherein the restricted permission type prevents the user from viewing data for the first data element.

20. The method of claim 19, wherein the creating step further comprises selecting data elements from the data model to be included in the data dependency path.

21. The method of claim 20, further comprising:

defining an unrestricted permission type wherein data is not restricted from the user;

wherein the selected data elements are assigned the unrestricted permission type.

22. The method of claim 1, further comprising:

defining a set of parameters within the data dependency path; and sending an alert if valid data matching the set of parameters is received into the data model.

23. The method of claim 22, wherein the data dependency path is selected from a plurality of data dependency paths.

24. A computer readable medium containing computer-executable instructions for performing a method for automatically calculating a data dependency path defining logically connected data usable to identify queried data said method comprising steps of:

analyzing a data model stored in one or more computer readable media to identify a data view of the data model, said data model comprising a propositional structure representing a grammar having a plurality of parts of speech, said propositional structure having 28 predefined data relations comprising identifiers modifiers, and descriptors related using predefined logical operators;

automatically creating the data dependency path based on the identified data view; and storing data identifying the data dependency path.

25. The computer readable medium of claim 24, wherein the creating step further comprises selecting data elements from the data model.

26. The computer readable medium of claim 25, wherein the creating step further comprises selecting a data perspective as a starting point for the data dependency path.

27. The computer readable medium of claim 26, wherein the data perspective is selected from one of a plurality of data perspectives.

28. The computer readable medium of claim 27, wherein each of the plurality of data perspectives is ranked according to semantic prominence.

29. The computer readable medium of claim 28, wherein the semantic prominence is calculated by performing steps comprising:

selecting a potential data perspective;

determining how many selected data elements are directly related to the potential data perspective; and ranking the potential data perspectives according to the number of directly related data elements.

30. The computer readable medium of claim 29, wherein the instructions further comprise repeating the steps for calculating semantic prominence for each potential data perspective.

31. The computer readable medium of claim 25, wherein the instructions further comprise, when two of the data elements from the data model have a similar name, displaying each similarly named data element and a description of each similarly named element prior to selecting data elements.

32. The computer readable medium of claim 31, wherein the instructions further comprise receiving a selection of one of the similarly named elements.

33. The computer readable medium of claim 25, wherein the selected data elements comprise a set of data elements about which the calculated data dependency path will return data.

34. The computer readable medium of claim 24, wherein the data view comprises data located in a plurality of databases.

35. The computer readable medium of claim 34, wherein the data view comprises a set of data elements.

36. The computer readable medium of claim 35, wherein the data view further comprises data relations in which the set of data elements participate.

37. The computer readable medium of claim 24, wherein the data dependency path is limited to the selected data view.

38. The computer readable medium of claim 24, wherein the creating step further comprises selecting a set of data relations in order to resolve a context ambiguity.

39. The computer readable medium of claim 38, wherein the selecting of the set of data relations limits possible calculated data dependency paths.

40. The computer readable medium of claim 24, wherein the creating step further comprises:
    retrieving a data perspective indicative of the starting point of the data dependency path;
    inspecting the data elements directly related to the data perspective;
    if any of the data elements directly related to the data perspective is a selected data element adding the directly related data element to the data dependency path.

41. The computer readable medium of claim 24, wherein the instructions further comprise:
    prior to creating the data dependency path:
        defining a restricted permission type wherein data is restricted from a user; and
        applying the restricted permission type to a first data element;
    wherein the created data dependency path uses the first data element as a pass-through.

42. The computer readable medium of claim 41, wherein the restricted permission type prevents the user from viewing data for the first data element.

43. The computer readable medium of claim 42, wherein the creating step further comprises selecting data elements from the data model to be included in the data dependency path.

44. The computer readable medium of claim 43, wherein the instructions further comprise:
    defining an unrestricted permission type wherein data is not restricted from the user;
    wherein the selected data elements are assigned the unrestricted permission type.

45. The computer readable medium of claim 24, wherein the instructions further comprise:
    defining a set of parameters within the data dependency path; and
    sending an alert if valid data matching the set of parameters is received into the data model.

46. The computer readable medium of claim 45, wherein the data dependency path is selected from a plurality of data dependency paths.

* * * * *